United States Patent [19]
Dalziel et al.

[11] Patent Number: 5,579,444
[45] Date of Patent: Nov. 26, 1996

[54] ADAPTIVE VISION-BASED CONTROLLER

[75] Inventors: Marie R. Dalziel, London; Neil E. Wiseman, Cambridge; Martin A. Oliver, Beckington; Andrew K. Forrest, London; William F. Clocksin, Girton; Tony R. King, Cambridge; Robert A. Wipfel, Bristol; Ian Warren, Northfleet; David J. Phillips, Sidcup; Ping D. Chuang, Plaistow, all of England

[73] Assignee: Axiom Bildverarbeitungssysteme GmbH, Berlin, Germany

[21] Appl. No.: 384,397

[22] Filed: Feb. 3, 1995

(Under 37 CFR 1.47)

Related U.S. Application Data

[63] Continuation of Ser. No. 466,282, filed as PCT/GB88/00707, Aug. 26, 1988 abandoned.

[30] Foreign Application Priority Data

Aug. 28, 1987 [GB] United Kingdom ............... 8720331

[51] Int. Cl.$^6$ ................................................ B25J 9/18
[52] U.S. Cl. ............................................. 395/94; 382/153
[58] Field of Search .............................. 395/94; 382/9, 382/22, 153, 154, 173, 199

[56] References Cited

U.S. PATENT DOCUMENTS 4,613,269  9/1986  Wilder et al. ........................... 364/513
4,835,450  5/1989  Suzuki ..................................... 395/94

FOREIGN PATENT DOCUMENTS 03934  11/1982  WIPO ..................................... 395/94

OTHER PUBLICATIONS

B. K. P. Horn, *Robot Vision*, MIT Press, (1986), Chapters 5 and 18, pp. 90–100, 423–449.

Use of Optical Feedback in the Computer Control of an Arm; Stanford Artificial Intelligence Project; Memo No. A. I. 56; William Wichman; Aug. 25, 1967; Stanford University Computer Science Department.

R. A. Brooks, "Model–Based Three–Dimensional Interpretations of Two–Dimensional Images," IEEE Transactions on Pattern Analysis and Machine Intelligence, vol. PAMI–5, No. 2, pp. 140–150. Mar. 1983.

Albus et al, "Hierarchical Control of Intelligent Machines Applied to Space Station Telerobots", *IEEE International Symposium on Intelligent Control*, 1987, pp. 20–26.

Kak et al, "Knoledge–Based Robotics", *IEEE International Conference on Robotics and Automation*, vol. 2, 1987, pp. 637–646.

(List continued on next page.)

Primary Examiner—Robert W. Downs
Attorney, Agent, or Firm—Pollock, Vande Sande & Priddy

[57] ABSTRACT

An adaptive vision based controller for controlling a robot arm comprises a camera, a segmenter for analyzing images from the camera, a tracker, sketcher and ranger responsive to information from the segmenter for creating a three dimensional segmented data list, a recognizer for receiving the data list and comparing data in the list against a database of plausible objects, and a planner interactive with the recognizer and responsive to task definitions for developing control outputs. The recognizer uses scenic information such as feature maps produced by the segmenter in conjunction with a knowledge base to construct a world model. The planner uses the world model and the task definitions to construct a plan in the form of a set of actions for accomplishing the defined task. By way of the control system, information about how the robot arm is actually performing a task can be compared with the desired task and the task can be updated if necessary. Thus the controller provides visual feed back control of the task performed by the robot arm.

20 Claims, 19 Drawing Sheets

OTHER PUBLICATIONS

Kawabe et al, "Robot Task Planning System Based on Product Modeling", *IEEE Compint—Computer Aided Technologies,* 1985, pp. 471–476.

Losano–Perez et al, "Handey: A Robot System that Recognizes, Plans, and Manipulates", *IEEE International Conference on Robotics and Automation,* vol. 2, 1987, pp. 843–849.

Riad et al, "A Hierarchical Vision System for Object Identification and Localization", *13th International Symposium on Industrial Robots and Robots 7,* vol. 2, 1983, pp. 1701–1710.

Shneier et al, "Model–Based Strategies for High–Level Robot Vision", *Computer Vision, Graphics, and Image Processing,* vol. 33, No. 3, Mar. 1986, pp. 293–306.

ADAPTIVE VISION-BASED CONTROLLER

This application is a continuation of Ser. No. 07/466,282, filed as PCT/GB88/00707, Aug. 26, 1988, now abandoned.

INTRODUCTION

The invention in general relates to adaptive vision-based controllers, and more specifically but not exclusively to the use of such a controller with an articulated industrial robot arm.

BACKGROUND TO THE INVENTION

The development of a general purpose controller capable of analysing visual information derived from one or more cameras (or other forms of electronic imaging devices), and using the results of the analysis to devise strategies for accomplishing manipulative tasks in real time, has attracted great interest in robotic circles in recent years. This is because a robot without some such external sensory input moves within its workspace without knowledge of its external environment, and derives orientation information only from the joint resolvers which form part of its servo control mechanism. This imposes severe limitations on the tasks that the robot can undertake and can make the costs associated with the installation very high.

Potential applications of an adaptive vision-based control system include:

Identification of objects

Location of objects and determination of their orientation

Inspection and Quality Control

Visual servoing

Navigation and scene analysis

Complex inspection

Automated assembly tasks

Hitherto, such vision-based controllers as have existed have been limited, special-purpose devices developed to perform specific industrial tasks. Thus any gain in speed has been achieved only by using dedicated vision systems architecture for specialist operations such as for example locating a frame on a car body during the insertion of a windscreen and these dedicated systems have required modifications in both the hardware and the software in order for the system to perform other tasks within the same generic classification. So far as the inventors are aware, there has hitherto been no successful utilisation of a truly general purpose vision-based controller.

SUMMARY OF THE INVENTION

In one aspect, the present invention comprises a single integrated system with a powerful architecture, capable of processing, analysing and interpreting visual and other sensory data, and making 'intelligent' decisions based on the results. It provides in particular for the generation of signals to control the behaviour of a robot arm so as to achieve accurate manipulation of objects with the aid of visual guidance.

In the practice of the present invention an hierarchical control structure is preferred since such a structure allows the control system to be partitioned in a way that maps directly onto the task hierarchy and at each level of the hierarchy feedback processing extracts from the sensory data and from the lower control levels the information needed for enabling control decisions to be made. Moreover, it is possible in the practice of the invention to distribute the various processing levels of the control system throughout a network of processing stations that can easily accommodate the different delays needed for visual processing.

Another aspect of the present invention provides a system framework for integrating visual data in the form of a single general purpose vision system. The system is arranged such that it allows the generation of signals to control the behaviour of a robot arm enabling accurate manipulation of objects to be achieved in response to an image input. The system framework is based on a modular and hierarchical control structure that allows independent development of a vision subsystem and multilevel communications system supporting reflex action, knowledge representation, visual servoing and information interpretation. The invention provides a hierarchical controller framework comprising a number of subsystems and each subsystem consists of several levels of processing, each level in turn being served by independent processors.

The controller system architecture incorporates a modular hierarchical control structure, which allows independent subsystem development, and a multilevel communications system supporting reflex action, knowledge representation, visual servoing and information interpretation. The invention comprises both the architecture and its component subsystems, each of which can contain several levels of processing The controller system as a whole acts to guide one or more 'Effectors' each of which may be a robot or any other controllable device capable of physical action or signalling, to perform a 'Task'. The overall result of this is the total control of the system objective and the permitted behaviour of these devices and their task performance.

The controller system initially contains two sets of stored data:

1. A 'Knowledge Base', which defines the domain of operation and contains data models of plausible objects; and 2. A 'Task Description', which defines the task.

The system is divided into a large number of interdependent subsystems. These may be regarded conceptually as three categories:

1. 'Low-Level' subsystems which are concerned with scene analysis and the extraction of features from images, using standardised procedures to extract hierarchical descriptions of scenes from camera images;

2. 'High-Level' subsystems, which recognise objects in the scene by comparing the hierarchical descriptions with the knowledge base to produce a highly refined description of the scene called the 'World Model'; and 3. 'Intermediate' subsystems, which combine elements of 1 and 2.

Low-level subsystems

The volume of image data provided by a video camera can be very large. Real-time processing, which is essential for visual servoing, requires the system to perform all the processing operations on all the data in the first image by the time that the data in the second image becomes available. This means that the controller system must be able to operate at very high speeds in order to process sufficient information and to make decisions based upon that information in the small period of time available between consecutive images.

Moreover, the system must be able to correlate the data present in, consecutive images.

The low-level subsystems are constructed of a plurality of independent processors each oil which may act on a different part of the image, and which are arranged into groups each of which may execute many processes independently, concurrently or in parallel. They utilise a plurality of information types such as 3-D 'sketches', colour data, texture data, and so on.

Much of the image data from the camera relating to tonal variations of reflections, shade, shadows, etc, is redundant for many purposes. Most of the low-level subsystems are therefore devoted to identifying the significant information which resides in discontinuities in image characteristics known as 'Features'.

The controller can incorporate various combinations of low-level subsystems depending on the nature of the application. These include:

1. A 'Segmenter', which decomposes the image into regions of approximately uniform hue (or, optionally, colour saturation or image intensity);
2. A 'Sketcher', which generates a 'Sketch' of the scene composed of arcs each of which represents a significant feature;
3. A 'Flow Subsystem', which produces pixel-velocity maps by comparing pairs of slightly different images;
4. A 'Texture Subsystem', which analyses the image in terms of texture;
5. A 'Tracking Subsystem', which tracks fiducial regions and features.

The invention provides a flexible hardware configuration to realise these subsystems. The hardware preferably comprises a processing array consisting of a plurality of interconnected processors such as Inmos Transputers. The raw image data is divided into smaller areas called 'Tiles' each of which is assigned to a different processor or group of processors. In this way the data is broken down into blocks which are simultaneously processed at very high speeds.

Several of the low-level subsystems are concerned with helping to solve the 'Correspondence Problem' of identifying points in different images which correspond to the same feature.

In an embodiment of the present invention which is described in detail hereinafter the operation of the segmenter is based on an adaption of the work of Marr & Hildreth (Proc. R. Soc. Lond. B 207, 187–217, 1980), Burt (IEEE Transactions on Communications, Vol. Com-21, No. 4, April 1983), and Bergholm (Trita-NA-8578, Royal Institute of Technology, Stockholm, Sweden, 1986).

Marr & Hildreth observed that each point in a filtered image arises from a smooth Gaussian average of nearby points and proposed a method of detecting so-called 'zero crossings' in the image so as to produce a closed contour map representing the edges. The Burt paper proposes a pyramid processing structure for compacting image data, and in the present invention Burt's proposed pyramid structure is adapted to defocus or 'smooth' image data. By use of these techniques, the segmenter enables raw image data from a camera to be quickly defocused to give a much smaller blurred image adapted for further analysis to yield the most relevant information in the image. For effecting this further analysis, an edge focusing method based on the teaching of Bergholm is used.

Bergholm suggests that the most severely defocused image of a series of progressively defocused images will contain the most pertinent information about any objects in the image. Bergholm accomplishes edge focusing by using responses from one image level to predict the occurrence of edges in a more finely focused image which correspond to edges in, the coarser image.

In the practice of the present invention, the segmenter subsystem uses an adaptation of Bergholm to produce a contour map which represents significant features of the scene. This is then further processed to produce a representation of the scene as a set of simple lines and arcs or so-called 'Strokes'.

Another feature of the segmenter is that it provides a colour segmentation process to represent colour information present in the image. Colour is conventionally represented as a vector in Red, Green, Blue (RGB) colour space. Compared witch monochrome (grey-scale) representation, this effectively triples the volume of data and greatly complicates the analysis. The majority of image processing techniques have therefore hitherto concentrated on monochrome images. The present invention provides techniques for redefining the three dimensional colour vector as a one dimensional scalar with a resulting reduction of required memory space by the use of a space-filling curve to define unique colours in RGB space.

The Sketcher Subsystem produces stroke information from a vertex list and a curve list. The information includes in detail the relationship between vertices and the characteristics of the paths connecting these vertices. Thus the invention provides means by which features in the image such as paths or strokes can be described as lists of data relating to lines, arcs or higher order polynomial curves detected within the image. In addition, these lists of information also provide pertinent information about the vertices and the connecting paths as, and when, required for a given application. In general, the invention enables most information about the image scene to be extracted by analysing the information available from the lists.

Optical Flow Subsystems are incorporated and utilise optical flow techniques to analyse the apparent movement of pixels between images. The data thereby produced may be used by the system in three different ways.

Firstly, pixels may be tracked between closely separated views of a scene and regions of homogeneous pixel vectors mapped as an aid to solving the correspondence problem.

Secondly, optical flow has exceptional ability to generate useful feature information from apparently 'featureless' smoothly changing surfaces.

Thirdly, as well as being used to construct a segmented image of the scene, the pixel vector map is fed into the input of the ranger (as described in greater detail in the ranger subsystem section hereinbelow) in the form of a pair of additional planes (representing the pixel velocity components in the x and y directions respectively) as a valuable supplement to the three colour planes (or a single monochrome plane) already present, thus giving both magnitude and angular information about pixel movements.

The texture subsystem analyses spatial frequency via one dimensional and two dimensional Fourier and similar transforms (e.g. cosine transform), and histogramming. In the practice of the invention, texture analyses can optionally be performed in colour or in monochrome. This makes the controller system exceptional in its ability to track features reliably under varying light conditions, and in its insensitivity to rotation. The texture subsystem also permits features to be identified by the texture characteristics alone. This is especially useful in distinguishing geometrically similar objects.

The tracking subsystem tracks pixel regions or features of interest across numerous image frames so that the relative movements of the features across time varying frames in terms of image coordinates are stored for subsequent processing, for instance to reduce ambiguous solutions due to correspondence problems inherent in stereo analysis. Tracking also encompasses the detection of unexpected intrusions within the robot arm workspace so that the handling of these intrusions is performed intelligently.

Intermediate subsystems

The intermediate subsystems combine a substantial amount of deterministic processing with more sophisticated knowledge-based activities. There are two principal classes of subsystem in this category.

1. 'Rangers', which generate depth and scale information from multiple views (derived either from a plurality of cameras or from several images from the same camera); and 2. 'Controllers', which drive effectors associated with the robot arm in order to achieve a desired action as directed by the planner.

The job of the ranger is to construct a three-dimensional representation of the scene which is invariant with respect to movement of cameras or effectors. The task requires well-defined features on objects that are locatable in a succession of images, and the ranger applies stereoscopic transformations to successive images in order to determine three-dimensional co-ordinates. The succession of images may be derived from a number of cameras, from a series of images obtained by moving a camera to different positions, from a static camera taking advantage of the relative movements of objects in the field of view, or from a combination of these. The ranger also provides range and related information as and when demanded by the other subsystems.

A further aspect of the present invention is the use of a known object present within the field of view of the camera to calibrate the system. The ranger is able to use inverse transformations to compute the characteristics of the camera and determine its precise position and orientation relative to other objects in the scene by referring to an internal model of the known object. The thee-dimensional co-ordinate system thus determined is invariant with respect to camera position, focal length of the camera lens, etc., as will be described in detail hereinafter. The known object may be a specially made 'Calibration Object' or may be an object which has previously been 'learned' by the system.

The system may incorporate one or more effector controllers, each of which incorporates a physical interface with an effector. An effector controller accepts feedback data from the rest of the system at various levels with a variety of loop delays to accommodate sensor information processing, thus achieving sensory-interactive behaviour.

High-level subsystems

The high-level subsystems provided by the invention exist to identify features in the scene of objects corresponding to object models in a knowledge base, and to generate appropriate decisions relating both to activity within the system and to actions by the effectors. They are divided into two functional blocks:

1. The 'Recogniser', a committee of high-level subsystems which together use hierarchical scenic information and feature maps produced by the low- and intermediate-level subsystems in conjunction with the knowledge base go construct a world model, that is to say a logical representation of the working envelope of the robot.

2. The 'Planner', a group of high-level subsystems which uses the world model and the task description to construct a plan which is a proposed set of actions for accomplishing the task. The planner also generates internal demands for further information from other subsystems as and when it is required.

To each class of scenic information generated by the low- and intermediate-level subsystems there corresponds a recogniser subsystem, whose task is to search that information for probable descriptions of plausible objects as described in the knowledge base. In general, the invention provides information associated with each description: location, orientations and confidence level for the object, together with a measure of its dimensional variation with respect to its knowledge base description.

Each recogniser subsystem is provided with facilities for requesting further specific information from the low- and intermediate-level subsystems. Normally only some (or one) of the many possible recognisers will be present in a given realisation of the invention.

In the embodiment of the invention described hereinafter, a recogniser is presented which operates by examining the set of strokes generated by the sketcher and attempting to match pairs of strokes, or transformed strokes, with topological information present in the knowledge base. It should be appreciated, however, that the recogniser provides additional functions in order to obtain all the necessary information to perform the task and all such functions are intended to fall within the ambit of the invention.

World models generated by the recogniser are passed to the planner, which overviews the operation of the whole system. In addition to receiving world models from the recogniser, the planner refers to the task description and constructs a schedule of actions or a plan needed to carry out the task.

While these actions are in progress, the planner can make predictions about the behaviour of significant features of known objects and compares these with the actual behaviour of the features as reported by the low- and intermediate-level subsystems. Any differences are then used to make corrections to the plan and to alert the planner to imminent events. The plan is decomposed by the planner into a hierarchy of levels, the lowest of which comprises a set of primitive actions. Details of these primitive actions are passed to the controllers for execution by the effectors.

In the practice of the invention, the planner is realised in the form of a 'Supervisory Process', which has access to global information about the state of the system and takes overall responsibility of execution of the plan, together with a number of 'Slave Processes', which work closely with the low- and intermediate-level subsystems and which filter results for use by the supervisor.

Flexible computer based hardware is preferably provided for the realisation of these systems. The hardware described hereinafter will be referred to as the Early Vision Module (EVM) which includes a camera or cameras, and areas dedicated to providing the functions of the segmenter, the ranger and the tracker.

The EVM comprises a number of processors (16 transputers in the described embodiment) arranged as a 4-connected array. These are primarily responsible for low-level image processing tasks. Additional processors (4 transputers in the described embodiment) provide connections to a shared memory bus, which may be a VME bus or Q bus, for connection to a frame store and host computer.

The invention thus provides methods and means for:

the adaptation and integration of hitherto separate image analysis techniques;

coupling these techniques with a decision-making function so as to provide an adaptive control system for the control, for example, of a robot arm;

substantially reducing the amount of data present in an image so that only the most important information remains;

producing from raw image data several progressively defocused images ranging from a finely defocused image to a coarsely defocused image;

detecting closed contours in defocused images and comparing contours thus detected in successive pairs of defocused images;

producing a map of partial contours in the most finely defocused image which correspond to parts of contours in the other progressively defocused images;

using partial contours to identify important features of a scene;

partitioning an image into regions of similar hue, intensity or saturation;

analysing an image in terms of its texture at each point of the image;

analysing an image in terms of its apparent pixel velocity at each point;

analysing an image in terms of vertices and the connecting relationship between these vertices;

defining image colour data as a unique scalar quantity by the use of mathematical functions with non-integer dimensional characteristics;

automatically determining the characteristics of a camera by comparing the image of an object with an internally stored model of the object;

obtaining depth information from two or more cameras by triangulation;

obtaining depth information from a single camera by comparing images of a scene separated in time;

tracking image data in a manner which provides a solution to the so-called correspondence problem;

tracking image data in order to find range or to assist in more accurate range finding;

using the tracking techniques as a tool to assist searching and correlation of image data;

comparing image information with a suite of internally stored representations of known objects so as to identify objects and their locations in three-dimensions;

making reasoned task-oriented decisions based on the extracted information;

decomposition decisions into primitive action commands which actuate servo motors which drive a robot arm, or some other physical device, through its workspace; and embedding the early vision functions in hardware thereby enabling real-time processing.

The invention is intended to include the above identified features both alone and in various combinations. For example, in one aspect the present invention provides a controller, for use with a robot arm for example for controlling movement in the execution of a predefined task, the controller comprising:

an electronic camera for providing images relating to objects or features in a defined workspace;

image processing means for processing images received from the camera to extract information relating to features in the images;

information comparison means for comparing information extracted from at least two processed images with information held in a knowledge base to derive an internal model of the workspace;

planning means for planning a sequence of actions to be performed in the execution of the task, the sequence being derived from the task definition and the internal model of the workspace; and dynamic comparing means for dynamically comparing performed actions with planned actions, and for interrupting the sequence if the performed action deviates substantially from the planned action and for requesting amendment to the sequence.

In another aspect the invention provides a controller for controlling movement of a robot arm in a defined workspace, the controller comprising:

task decomposition means for decomposing a desired task input by the user into discrete actions to be performed by the robot arm;

image reducing means for reducing images of the workspace to images containing only pertinent features;

identifying means for identifying objects and the relative positions thereof in the workspace by comparing three-dimensional models of the workspace derived from the reduced images with models of features known to the controller;

calculating means for calculating the robot arm movement required to perform the desired task from information associated with the discrete actions and the relative positions of the identified objects; and comparing means for comparing actual performance of the task with the required performance and for stimulating recalculation by the calculating means in the event of a significant deviation from the required performance.

According to another aspect the invention provides a method of controlling movement of a robot arm in a defined workspace, in which method:

a desired task is decomposed into discrete actions to be performed by the robot arm; images of the workspace from a sensory system are reduced to images containing only pertinent features; objects and their relative positions in the workspace are identified by comparing three dimensional models of the workspace derived from the reduced images with known features, the robot arm movements required to perform the desired task are determined from information associated with the discrete actions and the relative position of the identified objects; and the actual movements of the robot arm are compared with the required movements and the required movements are recalculated in the event of a substantial deviation therefrom.

Moreover, the invention also provides an apparatus for processing images at high speed, the apparatus comprising: a memory framestore for storing at least an image to be processed and a plurality of processing cells in communication with one another and with the framestore via a data bus; each processing cell comprising a plurality of image processing elements arranged to communicate with each other and to communicate with image processing elements in other processing cells via a controlling element connected to the data bus, and each image processing element being arranged to receive a portion of the image to be processed.

Furthermore, the invention provides a method of reducing an electronic image to a skeletonised form thereby to remove spurious information from the image, the method comprising:

producing a succession of increasingly defocussed images by repeated convolution of the image with a predefined kernel, detecting edge features in defocussed images and correlating the detected edges in the defocussed images to identify pertinent detected edge features thereby to producing the skeletonised form of the image.

In a further aspect the invention provides an adaptive vision based control system comprising:

a camera;

a segmenter for analysing images from the camera as regards their content;

a tracker, sketcher and ranger responsive inter alia to information from the segmenter for tracking features between images producing maps representing the images and calculating three dimensional information to create a three dimensional segmented data list;

a recogniser for receiving the data list and comparing data in the list against a database of plausible objects;

a planner interactive with the recogniser and responsive to task definitions for developing control outputs; and an action servo controlled by and interactive with the planner, and wherein the action servo is operative to bypass the tracker, sketcher and ranger and the recogniser and to pass data from the segmenter directly to the planner once an object has been recognised.

Other inventive features are defined with particularity in the appended claims.

BRIEF DESCRIPTION OF THE DRAWINGS

In order that the invention may be clearly understood, an exemplary embodiment will hereinafter be described with reference to the accompanying drawings, in which.

DESCRIPTION OF THE PREFERRED EMBODIMENT

Figure 1:
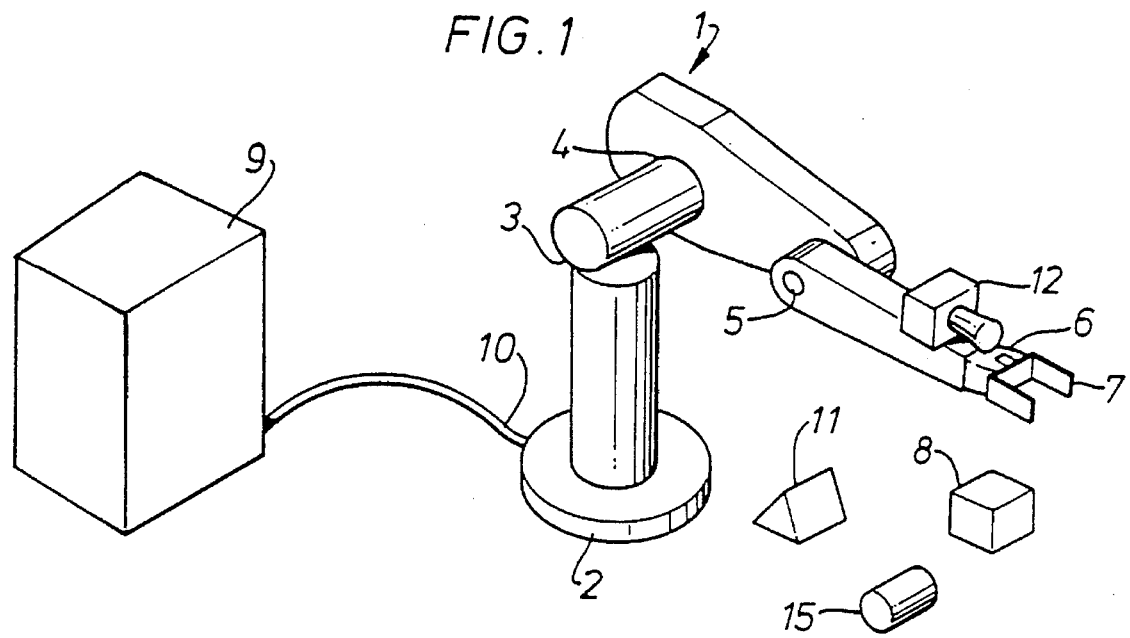
FIG. 1 shows an overall view of a vision-control system coupled to a robot arm, embodying the invention.
Figure 5A:
FIGS. 5(a)–5(d) show changes of contrast or intensity in an image.
Figure 5B:
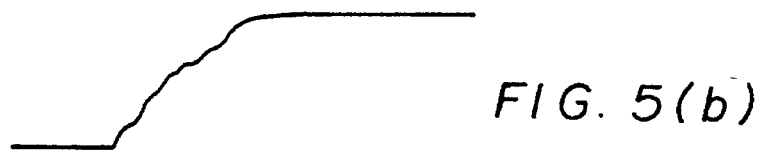
Figure 5C:
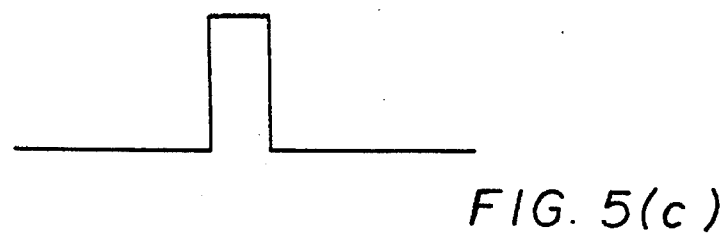
Figure 5D:
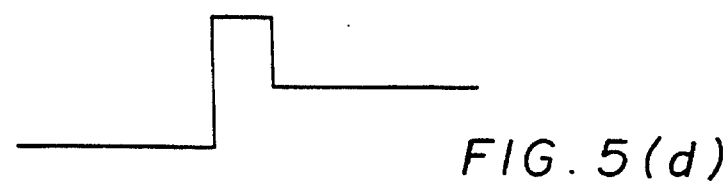

Referring first to FIG. 1, the system comprises a robot arm, generally indicated at 1, and a control system 9 connected to the robot arm 1 via an umbilical cord 10 which conveys control signals between the control system 9 and the robot arm 1. The control system 9 preferably comprises a general purpose computer, such as a MicroVAX II, together with purpose built flexible processing modules.

The robot arm 1 comprises a base 2 which is secured to the floor or any other suitable fixing site such as an overhead gantry or other mobile platform, a number of rotating joints 3, 4 and 5, a wrist joint 6 consisting of three independent controllable joints which provide pitch, roll and yaw movement to a manipulator 7 mounted on the wrist joint 6.

A colour video camera 12 is mounted on the robot arm at or near the wrist joint 6, or at any other suitable position, and provides the image information about objects 8, 11 and 15 in the arm's workspace for processing and interpretation by the control system 9.

Figure 2:
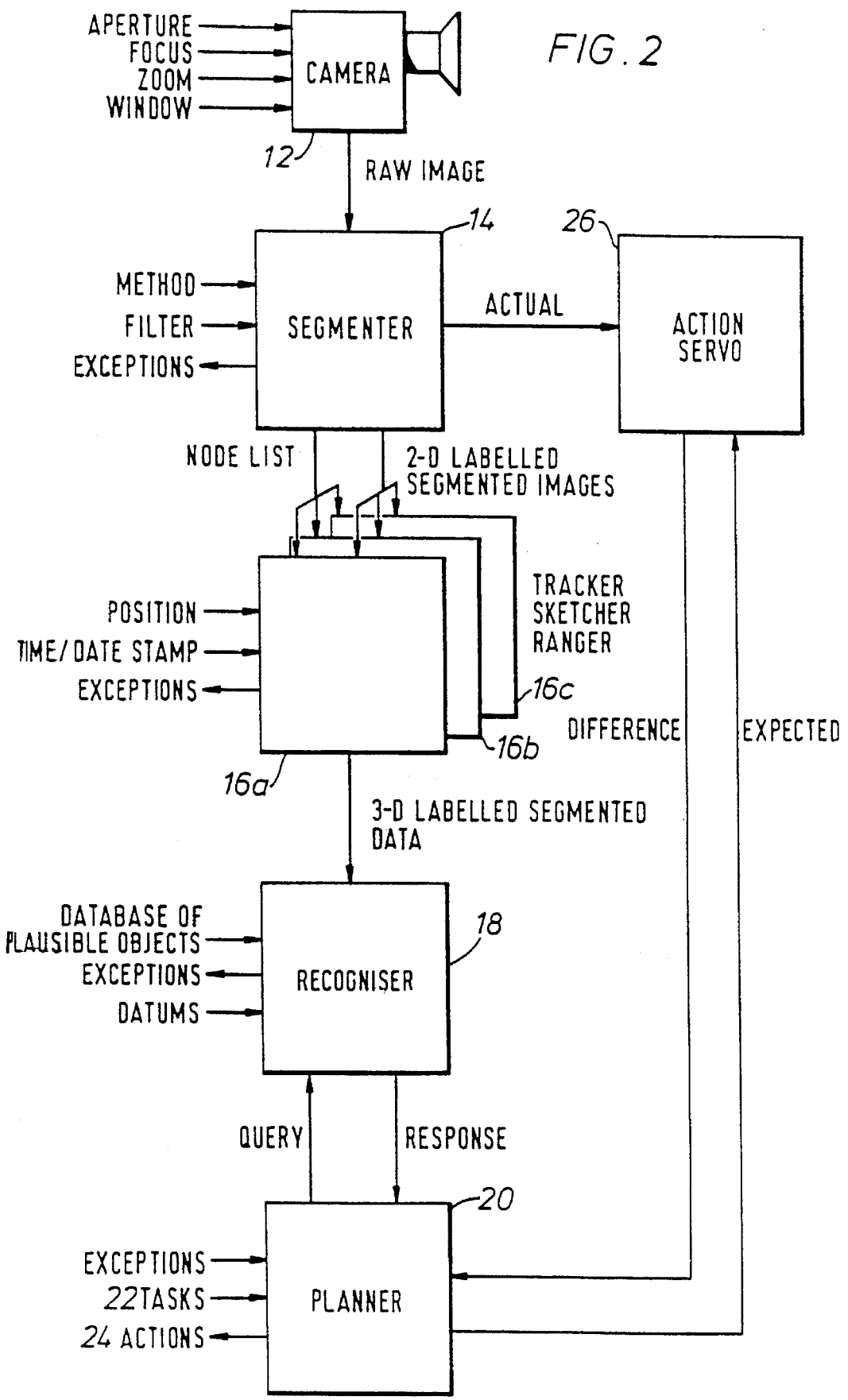
FIG. 2 shows a block diagram of the low-level and high-level subsystems.

Referring now to FIG. 2, the camera subsystem 12 receives data in the form of an image generated by the colour camera. The raw image information from the camera is passed to a segmenter subsystem 14 for early processing. The early processing involves analysing the raw image data and reducing it to a more readily handleable amount. Thus the segmenter extracts the most relevant data, for example intensity and colour variations, from the image and produces a contour map of the extracted edges. The colour information, coupled with the contour map can be passed on to other subsystems for further processing.

The image data produced by the segmenter 14, is passed to a ranger 16a which adds depth information to the 2-D labelled segmented images, a sketcher 16b which converts the data into strokes, and a tracker 16c which tracks relevant datum points ie. points of interest. The ranger, sketcher and tracker intercommunicate to provide relevant information for subsequent processing. The segmenter 14, the ranger 16a, the sketcher 16b and the tracker 16c are provided in a single hardware unit referred to herein as the Early Vision Module (EVM). The resulting information is passed to a recogniser module 18 which compares the incoming information to known models held in its database. Exact matches are not necessary and dimensional variations in the actual objects viewed are acceptable if they are within a tolerance determined by the high level subsystems when matching images to the known models.

A planner 20 oversees the operation of each module within the system. In response to an input task command 22 the planner 20 constructs a hierarchy of commands representing specific actions required by each module of the system. As each of the tasks is being executed by the modules the planner 20 oversees their operation and guides a control module 24 which activates the servo motors controlling the movement of the joints in the robot arm.

Once the ranger 16 and recogniser 18 have successfully identified a known object their operation effectively becomes redundant. In fact, continued use of these modules will significantly reduce the speed of operation of the system since they will continue to recalculate known data. The system is therefore provided with a bypass route from the segmenter 14 to the planner 20 by way of an action servo or Robot Control Module (RCM) 26 which maintains a difference signal between an image in a desired position and an image in its actual position. The difference signal is used by the planner to regulate the action commands 24. To aid this process known markers, datums, are placed at significant positions on the objects to enhance the ability of the system to identify the objects and to decide how the object should be picked up, moved and positioned by the robot arm system.

Figure 3:
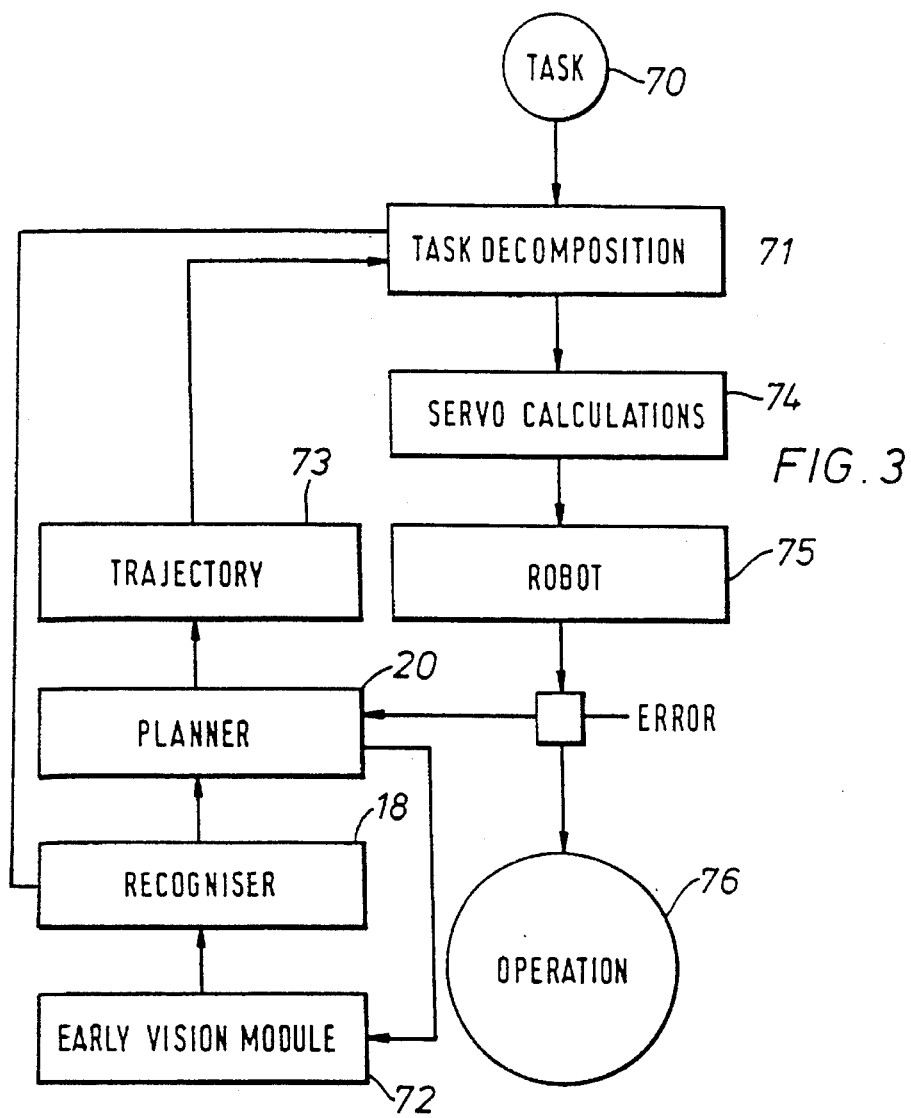
FIG. 3 shows the controller system in relation to other stages in the system.

FIG. 3 shows a further exemplary procedure for controlling the robot arm. In response to the input task instruction 70 the system first breaks the task down by way of a task decomposition process 71 as described in more detail in the recogniser and planner section hereinbelow. Part of this task decomposition process involves transferring data representing models of the required objects, and perhaps data relating to the estimated or expected position of the objects to the recogniser 18 to aid in the correct identification of objects to be manipulated etc. The recogniser 18 also received image information from the early vision module 72 and compares the received vision information with the required object model so as to identify and locate the objects in the real world. Thus identified, the planner 20 determines the most suitable way of carrying out the required task and calculates the trajectory 73 that must be followed by the robot arm during the execution of the required task. Task decomposition is an interactive process, and it may be necessary to make several passes through the process with additional object data being passed to the recogniser from the task decomposition stage 77 and additional image data, e.g. optical flow analysis from the early vision module 72 before the recogniser can correctly identify the required objects.

Once the trajectories have been calculated by the planner, the actions required by each of the servo motors at the robot arm joints to achieve this trajectory can be determined. The servo calculations 74 are then executed by the robot arm 75 resulting in the execution of the required operation 76. Errors introduced from external factors are compensated for by providing the planner 20 with information relating to the operation 76 being performed by the robot arm thus enabling the planner to recalculate trajectories, etc. should this prove necessary.

Figure 4:
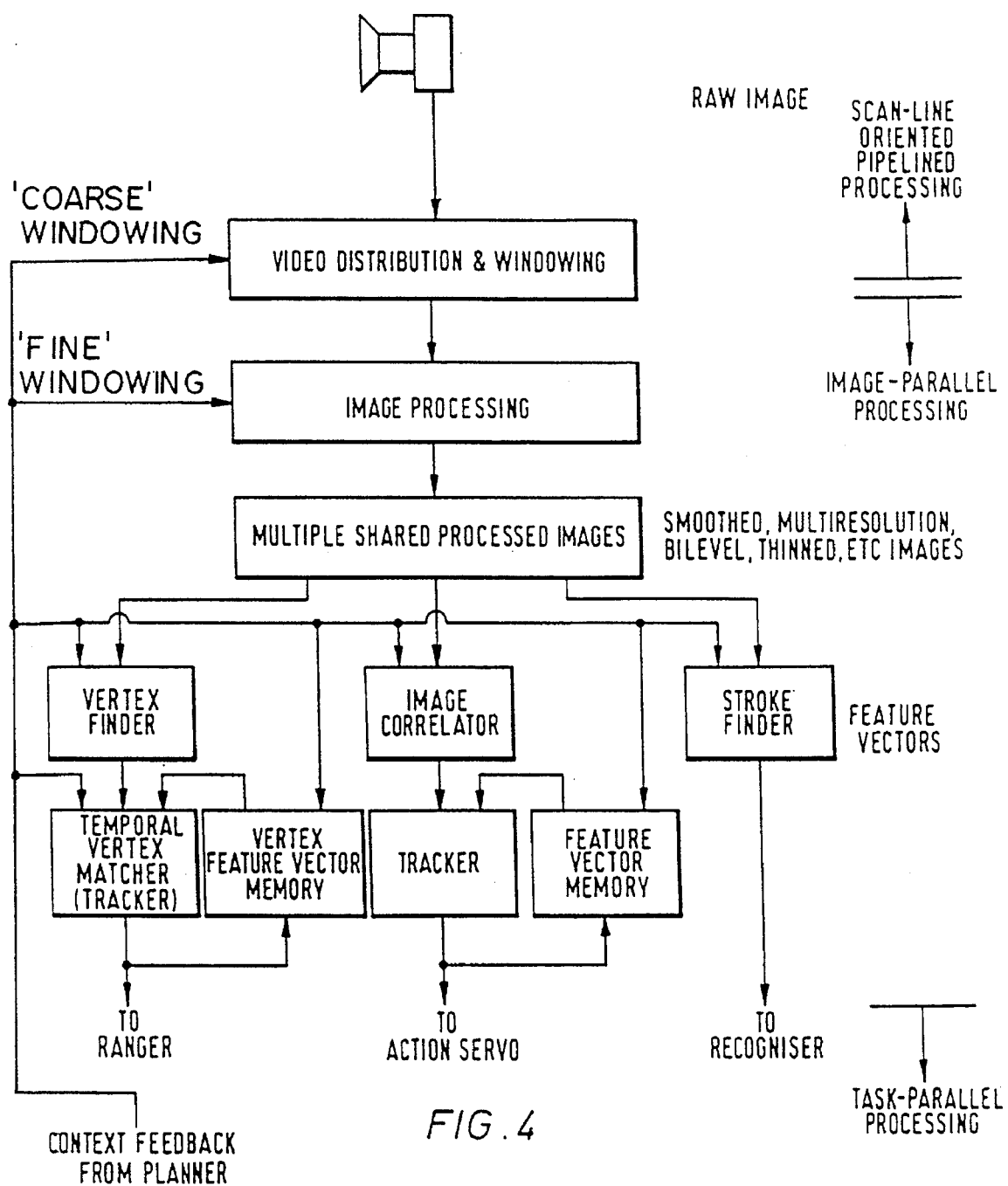
FIG. 4 shows a configuration of the early vision module.

FIG. 4 shows how data is transferred between different functional units along data paths within the low-level subsystems.

The image information detected by the camera is immediately processed to provide an initial set of image data in a form which can be more readily manipulated by the system. That is to say, the raw image data is processed to produce a filtered image. Known windowing techniques are applied to the filtered image in order to break the image down into smaller areas or tiles which can be processed independently by separate processing nodes as will be described hereinafter. The resulting smoothed image is passed to feature detection units, including: a vertex finder, a stroke finder and a tracker which identify and label features of interest in the smoothed image. The labelled features can then be passed on to higher level subsystems, such as the recogniser, for further interpretation.

The controller system is designed inter-alia to integrate colour vision with the industrial robot arm to provide a degree of flexibility which has hitherto not been achieved.

In a prototype of the system a demonstration task is used to identify and sort a number of different fruit types. The fruits used are oranges, red apples and green apples. This particular task introduces a number of complex tasks that can be separated into the two areas of recognition and manipulation. The recognition requires that the system can separate a number of different but not unique colours as well as recognising non-uniform but generally regular shapes. The task is complicated by not telling the system how many objects there are or whereabouts in the field of view the objects are. The task is decomposed into a number of discrete sub-tasks and the trajectories of the robot arm and end gripper are defined by a recognition system. The controlling software allows the system to make simple decisions so that if an exception is generated a new course of action can be taken so that the task can be best completed.

The computer architecture is complex to cope with particular demands placed on it by the processing requirements. The images from the camera are passed to the Early Vision Module (EVM) that is responsible for reducing the data to a form where it can be analysed. This requires a large amount of computer power and this is performed by specialised hardware built using INMOS Transputers. The information is then analysed by a Hierarchical Cognitive Module (HCM) ie. the recogniser 18 and planner 20. The HCM is provided by a host computer, the host preferably being a DEC MicroVAX. The colour of the object is only considered at this stage. The final part of the process is the Robot Control Module (RCM), which is also provided by the MicroVAX.

The robot used is a Rediffusion Reflex, a slow six axis industrial robot that is controlled by a RS232 interface.

The flow of data through the system is very complex both because of changes in data type through the software structure and because of the various complexities in the hardware design.

The information starts with a frame being captured from the colour camera mounted on the robot. It is stored as a 512×512×24 bit image on the transputer system. The data is then sent down through the transputer hierarchy and processed to produced single pixel width bit edge maps. The edge map is then considered to be a series of lines that are joined at nodes. The nodes are then written into a set data structure. This is the EVM processing completed.

The rest of the processing is performed on the MicroVAX and the information on the EVM is transferred. The data transferred consists of a list of nodes and the edge map consisting of a 512×512×8 framestore. The information is copied as a series of 64 Kbyte chunks using DMA.

The node information and edge information is processed to create a list of curves. By this stage the data has been greatly reduced. From the list of curves a series of centres and radii of circles is created given certain tolerance parameters. From these a list of possible fruit is made knowing the distance we are viewing the image from. Another image is now captured from the camera and held in the MicroVAX framestore as a 512×512×12 image. The colour at the calculated centre of the fruit is analysed and if it is within limits is it identified as a legitimate object.

In the example, list of fruit with the centres and radii is the end of the recognition phase.

The sorting phase starts with one of the objects being chosen to be removed by the robot. The robot is moved so that the object is in the centre of the camera. The next phase is to judge the distance to the fruit. This is done using a simple triangulation technique. The robot gripper is then moved by about 80% of the calculated distance. The fruit is centred once again and the robot starts a series of short moves in towards the fruit. The robot then moves a short distance and the beam between the grippers is checked. If it has been broken then the fruit has just entered between the gripper. Another image frame is examined to ensure that the fruit is skill there. Once the beam has been broken the robot moves in a final short distance, typically 25 mm, before closing the gripper on the fruit. The fruit is then moved to the required destination before the cycle starts again.

A number of exceptions can be generated during this process that makes the system follow a different course. At any stage after the initial recognition that a fruit fails any of the simple recognition tests, the system goes back to the start of that recognition cycle. If no fruit is detected during the recognition phase then the robot moves to a new start location and the procedure restarts. The system tries six different locations before dropping out of the program.

The system consists of three major hardware blocks: the host MicroVAX, the EVM and the RCM. Their structure and the part they play in the system will be generally outlined below.

The MicroVAX is the host computer for the whole system. It acts as the user interface both for commands and to display system messages.

The MicroVAX used has a standard 71 MB hard drive and 4 serial lines. The four serial lines are needed for the communications with other parts of the system. Two other boards are needed. The first is a DMA board. This is used to get the large chunks of data from the EVM into the MicroVAX. The second is an Imaging Technology (ITec) 100 series framestore. This is used to capture frames into the MicroVAX. The ITec board is 12 bits wide and can be used to display colour as 4 bits/plane.

The framestore uses a colour monitor to display the image from the camera.

The EVM is the most complex piece of hardware in the system. It is based on the INMOS Transputer and uses 20 such devices. It is used to process the initial data captured from the camera and reduce it so that the MicroVAX can perform the recognition operations.

The preferred system consists of:

20 Transputers

3 Framestores (512×512×8)

1 MB of main memory

1 DR 11W DMA controller

Figure 19:
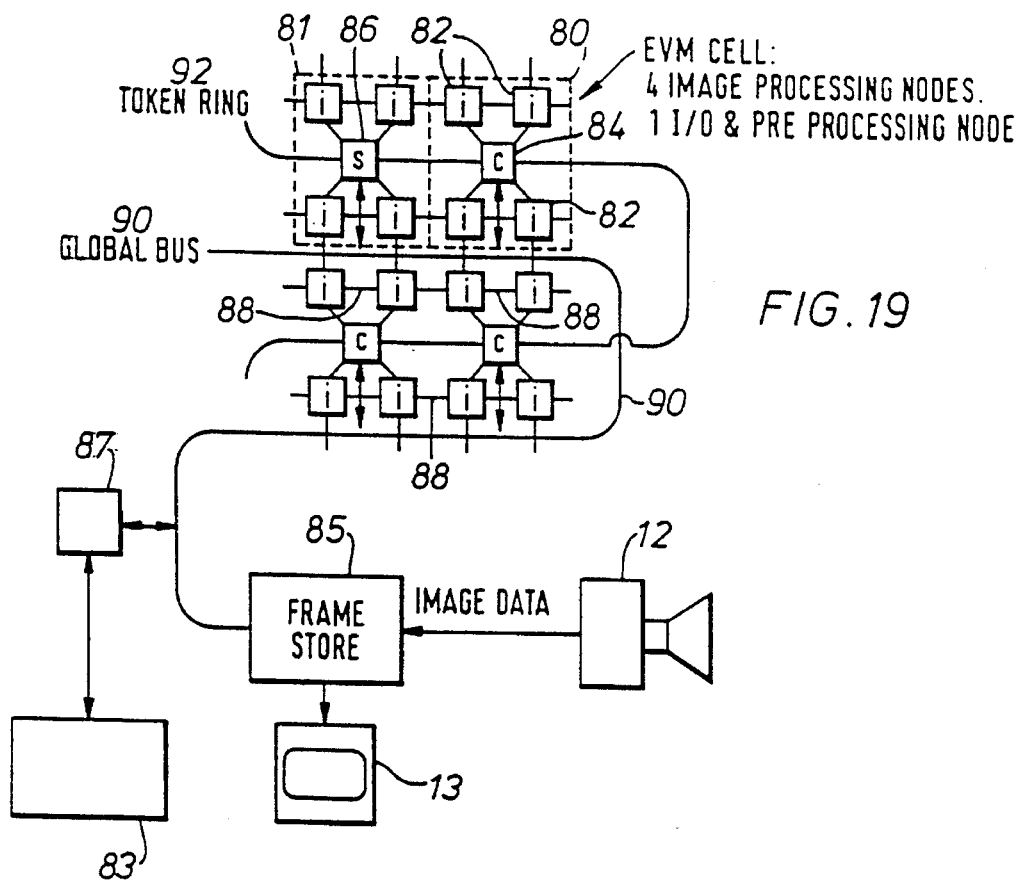
FIG. 19 shows an Early Vision Module (EVM) connected to a number of components in the system.
Figure 20:
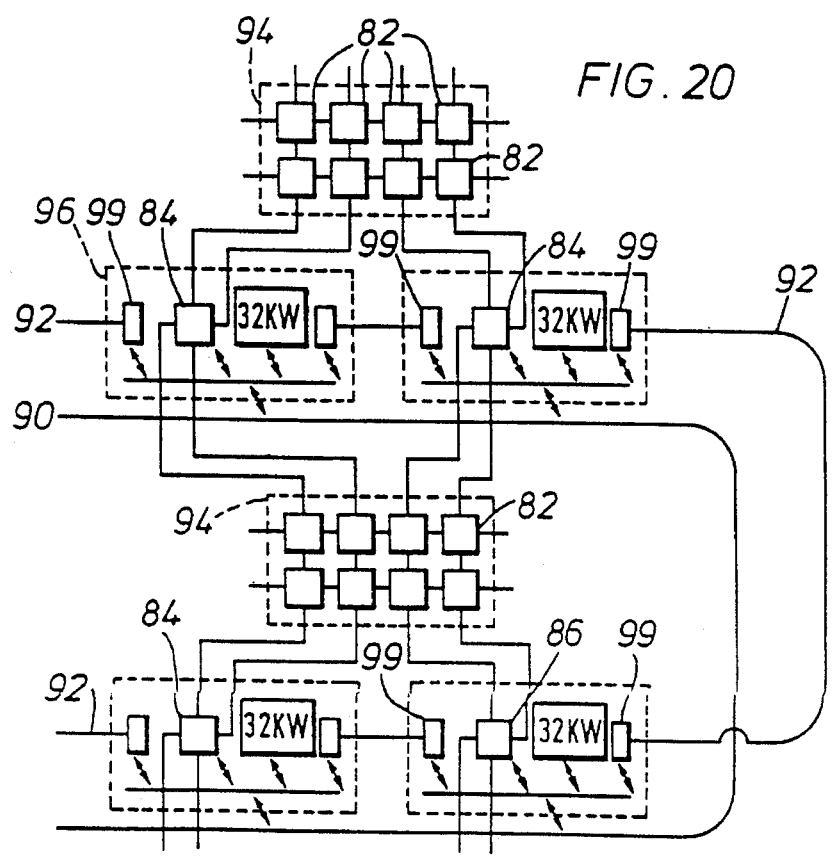
FIG. 20 shows the physical layout of the EVM hardware.

The transputers are based on a hierarchical structure as shown in FIG. 19 and 20 of the accompanying drawings.

There are three levels: The top level is called the supervisor (s) node. It acts as the link with the MicroVAX and controls the transputer network; Below that there are four control (c) nodes, these act as the link between the s node, the system memory and the actual processing elements; There are 16 imaging (i) nodes, four of each are attached to a c node.

Because there is no need to have a separate s-node one of the c-nodes also carries out the functions associated with the s-node.

The DMA controller is used to send data to the MicroVAX. For large quantities of data such as a complete frame the DMA has to be set up a number of times.

The final card is the VME bus controller that also has an RS232 interface on it which is used to pass commands to the array from the MicroVAX.

The robot consists of a six axis mechanism, the controller box and the robot terminal. The robot is connected to the controller cabinet by an umbilical cord. The cabinet is connected by an RS232 interface to a monitor terminal.

In the following, there will be descriptions in greater detail of the segmentation operation, the sketcher subsystem, optical flow and tracking, the ranger system, the Early Vision Module Hardware and the recogniser and planner.

SEGMENTATION

Image information provided by the camera system 12 is processed to reduce the amount of data to include only useful information. The amount of raw image data provided by the camera system is large; for example a single digitised image in a 512×512 image frame comprising 8 bit pixels contains over 2 million bits of information. With a typical frame speed of 25 image frames per second the total available information is in excess of 50 million bits per second. However, a large amount of this data is redundant since it contains little information of use in identifying objects in the field of view.

Image analysis is a task that can readily be subdivided into smaller independent tasks which can be performed in parallel. By exploiting this characteristic, it is possible to implement general purpose hardware to analyse features and patterns in space and time (as will be described in the Early Vision Module Hardware section).

Segmentation is a coarse but very fast image decomposition technique, especially when implemented in hardware. The results of the segmentation analyses are held in local memory and are used by other processes in operations such as matching the images obtained from two or more cameras, or comparing consecutive images obtained from a single camera.

The first process in analysing the image is to remove redundant information from the image. The digitised image is initially tiled, that is to say it is divided into smaller image areas in order to reduce the large volume of data into more readily handleable packages. Each of the image tiles is then individually processed concurrently by a separate processing unit. Each separate processing unit, described below, executes an edge focusing algorithm mainly only on the image tile assigned to it; there is a degree of overlap between tiles so that the continuity of detected contours between one tile and the next can be determined.

In any image, significant information can be derived from discontinuities in the intensity and contrast of the image. Such discontinuities are generally referred to as edges. They usually stem from physical phenomena including changes in surface orientation, surface texture, illumination and depth.

In practice, an image of the real world is built up from a number of discrete picture elements ("pixels"). This frustrates the detection of the intensity discontinuity by introducing positional inaccuracies and other noise into the stored image.

Abrupt changes in contrast can take several different forms some of which are shown in FIG. 5. The most common is the step edge shown in FIG. 5(a). FIG. 5(a) shows the intensity profile of an ideal case of a step edge, however in practice the presence of noise and other sources of blurring turn step edges into ramp edges as shown in FIG. 5(b). A step edge separates two regions with different contrast values on the two sides of the edge. Another important type of detectable contrast discontinuity is a line. FIGS. 5(c) and 5(d) show idealised examples of the line, which may be defined as a thin strip with different characteristics to the regions on either side of it. Lines often occur in association with edges; for example highlights on edges of blocks, tracks running between different areas of a printed circuit board etc.

A difficulty with edge detection, which the present invention aims to solve, is that the detected edges often have gaps in them at positions where the transition between regions is not sufficiently abrupt. Moreover, spurious edges may be detected at points that are not truly part of the region boundaries as discussed above. Thus, the detected edges will not necessarily form a set of closed connected contours that define closed regions.

Several attempts have been made, width varying degrees of success, to solve the conflicting goals of detecting both intensity discontinuities and their precise location. However, it is generally accepted by those skilled in the art that the best way of achieving noise elimination from an image is by some form of local averaging or smoothing which, by its very nature, results in a loss of accuracy.

One method of edge detection is that known as the Marr-Hildreth method. Marr and Hildreth have proposed a method which identifies clean, smooth, continuous contours by finding the zero crossings i.e. the points at which $V^2I=0$, where V is the Laplacian operator, in a Gaussian smoothed image I. The most important aspect of the Marr-Hildreth approach is that the edges are detected as closed contours, thus simplifying node identification by eliminating spurious lines terminating in single nodes or vertices.

The Marr-Hildreth method assumes that apart from the occasional diffraction pattern the visual world is not constructed from wave-like primitives that add together over an area, but from contours, creases, shadows, and the like. Therefore the contribution to each point in a filtered image arises from a smooth average of nearby points, rather than widely scattered points.

The Marr-Hildreth method uses a range of spatial filters with Gaussian distributions and each with different spatial frequency cut-offs which are applied to the original digitized image. The Gaussian distribution of the filters optimises the two localised conflicting requirements of a filter which is smooth and localised in the spatial domain and a filter whose spectrum is smooth and band limited in the frequency domain. The result from each filter is a defocused image which is stored in a separate memory plane or "channel". The defocused images stored in each of the channels are then double differentiated by applying the Laplacian operator V to the image and finding the point at which $V^2I=0$, where I is the image data, whereby edge contours are located. The resulting edge contours in each of the channels are then compared, to reduce noise, by identifying and retaining edge contours which are common to several channels and discarding contours which only appear in a small number, or one, channel.

The Marr-Hildreth method is wasteful of memory space because groups of pixels from the first image are defocused onto a second image with the same number of pixels as the first image. Since defocusing removes some of the information from the original image, using the same number of pixels to represent this information is unnecessary.

Figure 6:
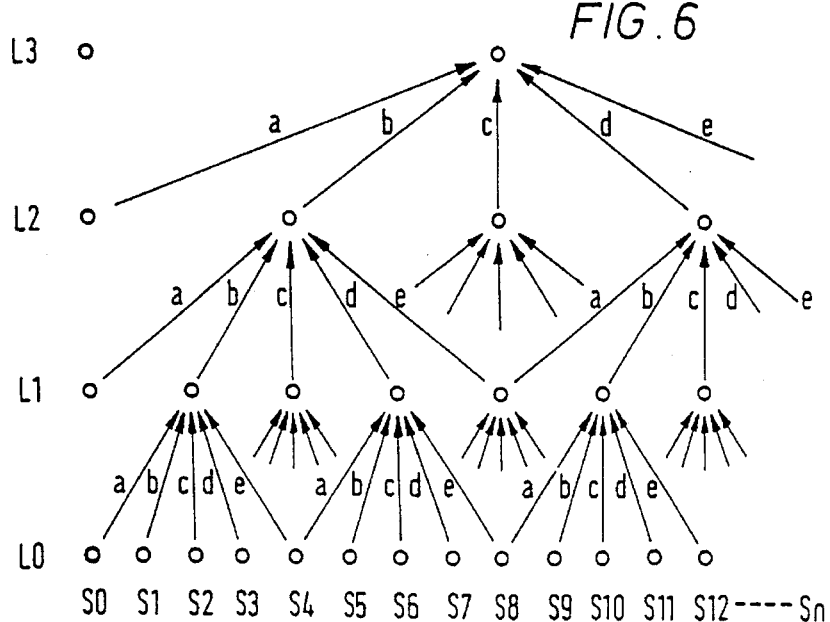
FIG. 6 shows a pyramid structure used to correlate discrete samples in one dimension.

Burt on the other hand has proposed a pyramid structure which is used to compact image data. Another aspect of the invention lies in the realisation that Burt's pyramid structure can be adapted to smooth images, even though this is not the primary use of the pyramid. FIG. 6 illustrates how the pyramid structure is used to correlate discrete samples in one dimension. Four levels of nodes (L0, L1, L2, L3) having spatial positions S0 to S12 are shown. A generating kernel, shown as a pattern of arrows a, b, c, d, e, is applied to each of the nodes in level L0. The kernel is a weighted summation type calculation wherein samples which are further from the central sample are given less importance than those nearest to the central sample. The kernel acts first on the samples in positions S0, S1, S2, S3 and S4 in level L0 to produce the sample at position S2 in level L1. The kernel is then shifted so that it acts on the samples S2, S3, S4, S5, S6 on level L0 to produce the sample on level L1. This process is repeated for every sample on level L0 to produce the new samples on level L1.

The whole process is then repeated on the newly created samples on L1 so that the kernel acts in the same manner upon every sample in the level L1 to produce further samples at level L2. That is, the kernel acts first upon the samples as S0, S2, S4, S6, S8, since there are no samples at S1, S3, S5, S7, S9, next upon samples at S4, S6, S10, S12 and so on until a new set of samples has been created at level L2. The kernel function remains the same between each level, but because of the increased spacing between sample points, the width of the kernel may be regarded as having increased between each level.

This example illustrates the Burt pyramid for only one-dimensional data for ease of explanation. However, it will be well understood by those skilled in the art that the idea can easily be applied to image data which is, of course, two dimensional. Since there is only a finite amount of image data, excessive repetition of the process would eventually lead to a single sample value remaining. Clearly this is unsatisfactory so far as image processing is concerned. Thus, image compression is normally limited to a reduction by, for example, 3 or 4 levels only, or by an amount determined by the nature of the processing to be executed.

By careful choice of the values assigned to a, b, c, d, e for the kernel, the filtering function can be approximated to a Gaussian distribution as identified by Marr-Hildreth. Thus, by combining the teachings in Burt and Marr-Hildreth, several levels of defocused images are quickly formed, from which closed edge contours are identified by applying the Laplacian operator V to the image data to detect the zero-crossings, and hence any edges. The effect is that the original 512×512 image is convolved With 5×5, 9×9 and 17×17 kernels to produce the 256×256, 128×128 and 64×64 images, respectively.

In the controller system the initial digitised image data, ie. the image data at L0 held in a 512×512 matrix, is convolved with for example a 5×5 kernel to form a second image at L1 in a 256×256 matrix. The second image is then convolved with the 5×5 kernel to form a third image at L2 in a 128×128 matrix. Finally a third image is convolved with the 5×5 kernel to form a fourth image at L3 in a 64×64 matrix.

An edge focusing method, first identified by Bergholm, attempts to combine positional accuracy with good noise reduction by detecting and tracking edges through a series of images from the coarsest, level of defocusing to the finest level. Bergholm suggested that edge focusing may be achieved by taking a sequence of averages of the same image each with a slightly different support, for example the supports may be 31×31, 29×29, 27×27, . . . , 7×7. The significant edges are then detected at the coarsest resolution, since these are the edges that can be determined with the highest accuracy. The edges that are detected at the coarsest level may include cases where several edges in the scene cause only one detectable response. This is not a problem since these edges will separate out during the focusing process. The focusing process itself involves using responses from one image level to predict the occurrence of edges at the next, finer levels. In this way edges are tracked and only those parts of the edges which do not belong to the coarser image need to be identified and kept as the focusing process moves to inner levels. However, Bergholm truncates the edges in the smoothed images since the method is not concerned with detecting closed contours but rather with detecting line segments.

The controller system uses an adaption of the Marr-Hildreth, Burt and Bergholm methods to provide a process by which the segmentation of the image is achieved quickly and the resulting data passed on for further interpretation and response thereto.

Figure 7:
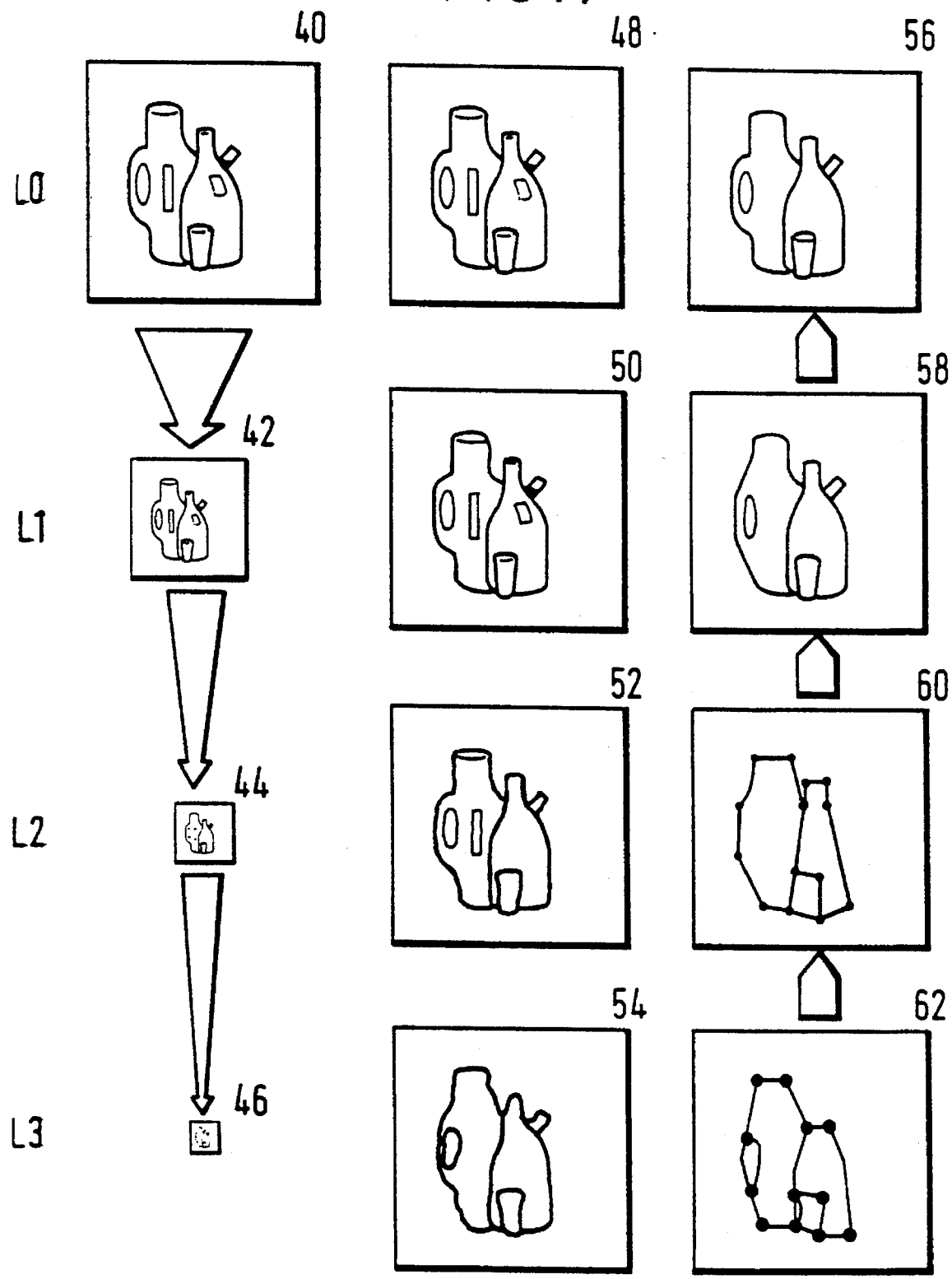
FIG. 7 shows an example of a segmented map produced from a raw digitised image.

FIG. 7 illustrates this process applied to raw digitised image data to produce a segmented map of the image for further interpretation. The raw digitized image data held in a 512×512 matrix 40 on image level L0 is convolved, using values in a kernel based on a Gaussian approximation, to produce a new blurred image which is held in a 256×256 matrix 42 on image level L1. Image convolution is then repeated on this blurred image using the same kernel values to produce a second blurred image in a 128×128 matrix 44 level L2. The convolution process may be continued down for as many levels as is desired. However, it has been found that sufficient blurring of the image is obtained at either image level L3 or L4, although the system includes means for going further down the image levels if this should prove necessary.

The picture windows 48, 50, 52, 54 shown in FIG. 7, represent the images at each level of the pyramid drawn to the same scale to illustrate clearly the effects of blurring the image at each level. The contours detected in the image 54 on image level L3 are shown in the window 62. Similarly the edge contours found at levels L2 and L1 are shown in the windows 60 and 58 respectively. It can be seen that the edge contours found in image level L3 are significantly fewer in number than those found in the preceding levels. The contours found at the image level L3, ie. the coarsest level of blurring, are the most significant because they remain after the harshest level of selective filtering. The contours at L3 are compared with the contours at L2 and corresponding contours on L2 are kept. The comparison process is repeated between levels L2 and L1, and so on as desired until a sufficiently accurate count map is produced.

Figure 8:
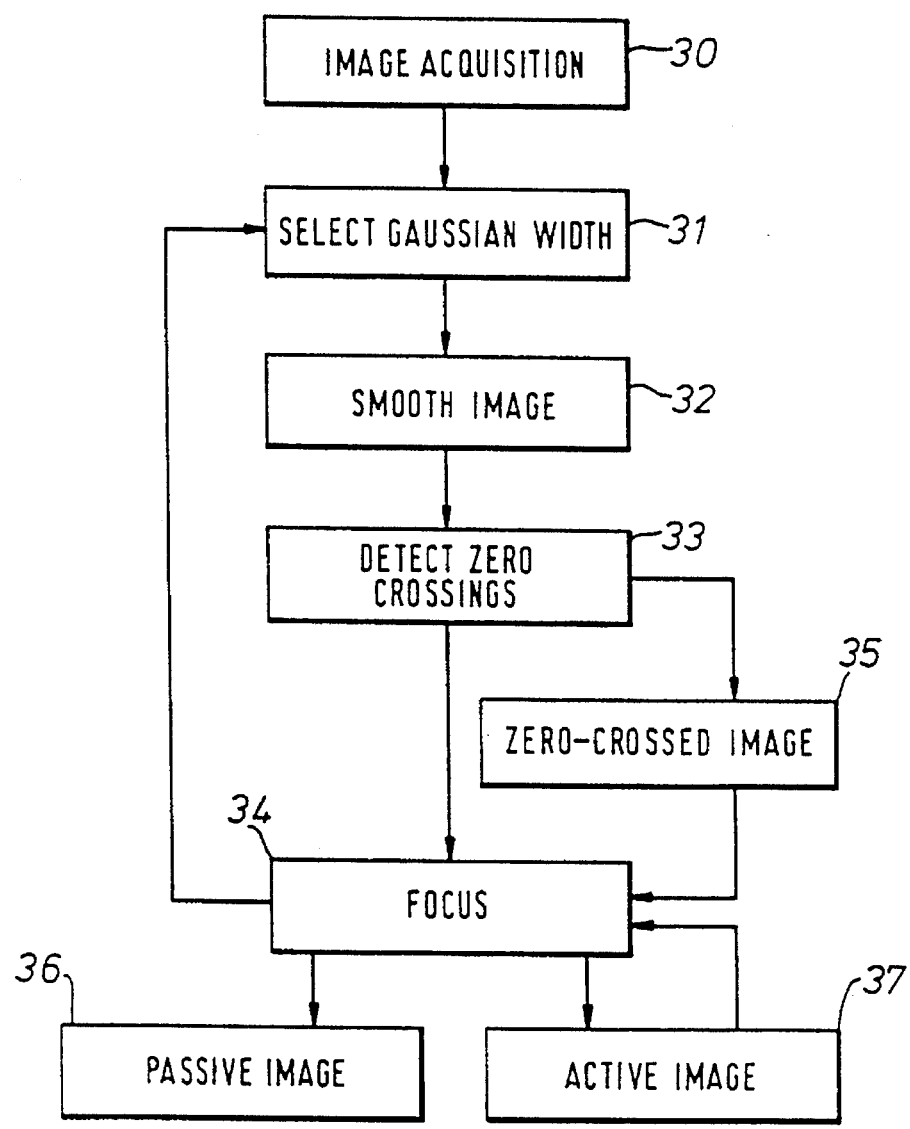
FIG. 8 shows features of an edge focusing method used in the segmenter.

FIG. 8 shows the essential features of the edge focusing method used in the segmenter. The initial step is the image acquisition stage 30. During this stage the image is received by the solid state camera or cameras and is subsequently digitised. The next step is the kernel width selection stage 31. As explained above the width of the kernel increases with each image compression, although the number of the sample points and the way in which they are operated on remains fixed. In the image smoothing state 32 the selected kernel, for instance a kernel of size 7×7, operates on the sample in the image to produce a defocused image The next step is to detect zero crossings 33 and then to produce and store a closed contour map 34 of the defocused image. On the first pass, the stored contour map 35 is passed by the focusing stage 34 to an area which holds the active image 37. The active image 37 contains all of the contours which are common to the images at several levels of focusing. Thus, on the first pass the active contours are all of the contours in the first defocused image. The edge focusing sequence is then repeated by selecting a new kernel width at stage 31, say 5×5, and then passing through stages 32, 33 and 35 as previously. On this pass however, the stored contour map 35 produced is compared with the active image 37. A new active image is produced by the focusing stage 34 which identifies the active elements as those contours which are common to both the old active image and the present contour map 35. Those image elements which change between the old active image and the present contour map 35, are said to be passive elements and are stored elsewhere for further processing if required. The process may be repeated as many times as necessary; the system includes means by which the number of passes may be adjusted to give a more meaningful active image, should this provide necessary. The product of this process is a two-dimensional labelled segmented image from which a vertex list and a curve list are produced.

Once the contours have been identified by the edge focusing method described above, image segments defined by closed contours are examined for their colour content.

Figure 9A:
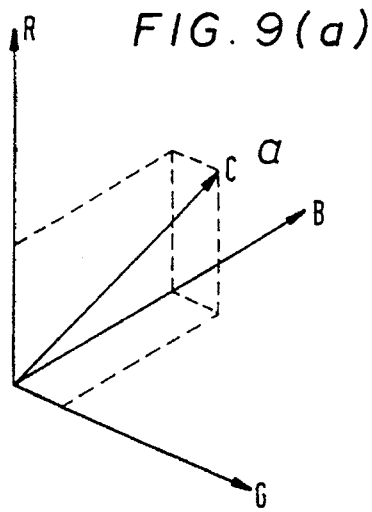
FIG. 9(a) shows a colour represented in 3-dimensional colour space, and 9(b) shows a space filling curve.
Figure 9B:
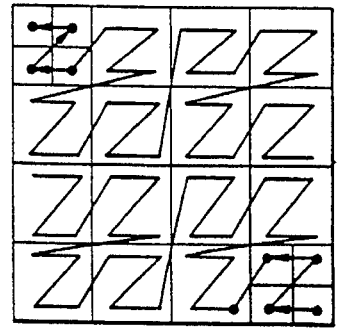

A full colour image will include colours covering the spectrum from black through to white. Colour is conventionally represented as three vector components: Red, Green and Blue (RGB). FIG. 9(a) shows how a given colour (C) is conventionally represented in the RGB colour space. However, this method of representation is wasteful of memory space since each colour component of the RGB vector requires unique memory fields to define the value of the colour component. The present invention provides a method of redefining the three dimensional RGB vector as a one dimensional scalar, with a resulting reduction of required memory space. FIG. 9(b) shows a way in which a space filling curve algorithm can be used to fill in colour in a bounded area. This method can be extended into three dimensions and used, not to fill in colour in a bounded area, but instead to define the colour of a segment as a colour index representing the distance along the space filling path in colour space. The system includes several such space filing algorithms of which the Hilbert space filling curve is an example. Each of the space filling algorithms vary in some manner which causes the point C in RGB space to be reached along a different path, giving a different colour index to the same point C.

A contrast in colour leads to a contrast in the colour index and so all the edges in the image should be detected. However, there will be other spurious contours created which do not exist in the real object in cases where points which are nearby in colour space do not correspond to nearby colour indices along the path. The spurious false contours can be removed by concurrently segmenting thee original image using different carefully-chosen space filling curves and removing erroneous contours. Alternatively, they can be left for removal by subsequent processing since many other false contours arise from such things as shadows and other lighting artifacts which are removed subsequently in any case.

An alternative but more complex approach to processing full colour image, which is provided in the invention, is to examine the magnitude of the RGB vector difference between two pixels. The magnitude is then used as an indicator of the contrast between the two pixels. However, this approach is expensive since it complicates the calculation and slows down the segmentation process, though it does do a technically better job in situations where different colours would otherwise be mapped into space filled regions that show insufficient contrast. An example of this approach is to differently weight and treat the segmentation of each RGB vector independently and combining the result for the final edge contour.

A variation of this is to give each of the RGB vectors a different weight initially and segmentation be performed only once on the combined vectors. The later approach results in a pixel value containing interleaving colour bits or colour coded bits of ascending magnitude. For example, if RGB vectors of 8 bits wide are bitwise represented by R7 to R0, G7 to G0 and B7 to B0 in three different colour planes, where R7 is the seventh most significant red bit of the pixel and so on, interleaving the three colours will result in a single vector containing R7, G7, B7; . . . ; R1, G0, B0; R0,G0,B0.

Figure 10:
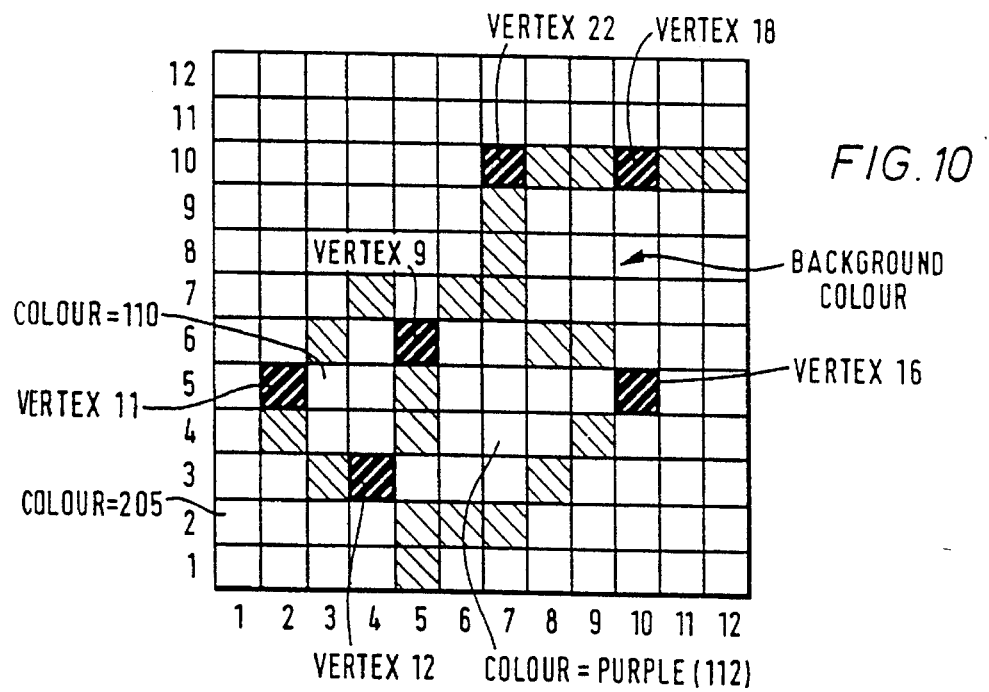
FIG. 10 shows an example of a contour map produced from the segmentation process.

FIG. 10 shows an example of a contour map produced from the above process. The contour map is examined further to produce a vertex list corresponding to the nodes or vertices in the contour map. The term "vertex" will be used hereinafter in reference to nodes in the contour map to avoid confusion with processing nodes in the EVM described hereinafter. In the preferred embodiment the regions bounded by closed contours are labelled with unique keys by passing over the image and building a map of tentative region labels, followed by merging the map to actual region numbers by use of, for example, an associative memory. Vertex types are identified by the valency of the vertex at a given co-ordinate, and vertices connected to the vertex in question are identified so that regions which meet at that vertex are identified. With all of this information a vertex is fully described.

Once the two dimensional labelled segmented image or contour map has been produced by the sketcher it is analysed in order to locate nodes or vertices in the detected edges. Each pixel that lies on a detected edge is analysed by examining adjacent pixels lying on the same edge or contour. In order to determine whether or not the pixel corresponds to a vertex in the contour map. If the pixel corresponds to a vertex it is marked as such and the examination is then repeated for the next pixel lying on the contour and so on until all pixels on the contour have been examined when all vertices on the contour will have been identified. The examination process is then performed on the next contour and so on until all vertices in the contour map have been identified.

The examination process also identifies the valency of each detected vertex, that is to say the number of contour lines which meet at a detected vertex. Each pixel on a contour could be regarded as a vertex having a valency of two, because each pixel on a contour will have at least two adjacent pixels lying on the same contour. However, to describe each pixel on a contour as a vertex having a valency of two would be of little use in producing a succinct description of the contour map and so instead only pixels corresponding to points where the curvature of the contour exceeds a predetermined value are marked as vertices having a valency of two. Where a number of adjacent pixels correspond to points where the curvature exceeds the predetermined value, the pixel corresponding to the point of maximum curvature is marked as a vertex having a valency of two.

Where a vertex having a valency greater than two is located for example a valency of three, the vertex is marked as such and the examination process continues along one of the lines at the vertex. The other line is marked as not yet having been examined and once the examination process has been completed for the fist line, the marked other line is examined.

At first this process is relatively slow because each time a vertex having a valency of greater than two is located the other lines at that vertex will have to be examined separately. However, the process soon quickens as examination of a marked line at one vertex reveals that it corresponds to a marked line at another vertex. Once every line in the contour map has been examined a vertex list describing the location and interconnecting relationship of each vertex in the contour map will have been produced.

The system presents vertex information in a predetermined format which may be as follows:

Vertex type, x co-ord., y co-ord., [index, (index(index . . . ))], [index, (index(index . . . ))], . . .

where the parentheses represent index parameter which will only be included in the vertex description if they exist. As an example, the first group of indices, denoted by the square brackets for ease of explanation, contains the vertices that directly connects to this vertex. The second group of indices contains the real distances connecting the main vertex and the others. The real distance in this case is defined as the actual integer number of pixels covered while traversing one vertex to another and not the mathematical straight line distance which can be easily calculated from the coordinate values. This real distance is significant for subsequent stages of processing, for instance, to decide whether a path is a line or a curve. The second group of index parameters, for example, relate to the colour, or tone if a grey scale is used.

In FIG. 10, the vertex 12 is a vertex of valency 3 and x, y co-ordinates (4,3), connected to vertices 9, 11 and 16. The real distance connecting vertex 12 to the others are 3, 3 and 6 pixel units respectively and regions 110 and 112 and the background 205 meet at the vertex 12. Therefore, the vertex description for vertex 12 is:

Vertex 12:3,4,3,[9,11,16],[3,3,6],[110,112,205] . . .

The square brackets are used only for ease of explanation and are not included in the computed vertex list. The commas serve only as convenient delimiters and any unique delimiter can be used. Is should be noted that additional indices can be included in the vertex description if necessary. In the above example, the indices are represented in numerals but they can also be easily represented symbolically or by character strings. Thus the vertex description for vertex 16 can be represented by:

Vertex 16: 2, 10, 5, [12, 18,] [LENGTH_A, 35.5 mm,] [BACKGROUND, PURPLE,] [C56, CURVE_X,] . . .

In this example, LENGTH_A refers to a symbolic representation of the path connecting vertices 16 and 12. 35.5 or 35.5 mm represents the floating point value in the real world in millimeters after subsequent transformation. BACKGROUND and PURPLE can be a number representing a single intensity level, or a band of intensity levels, in monochrome or in colour, or any other required representation. In this example, C56 and CURVE_X denotes the path connecting vertex 16 to vertex 12 and 18. C56 points to curve number 56 in the curve list (refer to the next section on the sketcher subsystem) and CURVE_X points to another curve on the list.

It is important to note that a vertex of valency 2 is a vertex of unique properties since any pixel along a path is also connected to two adjacent neighbours and can thus be regarded as a vertex of valency 1. However, a vertex of valency 2 is preferably identified by a point along a path which exceeds a given curvature threshold. If numerous and adjacent pixels fulfill this threshold, the maximum deviation is marked as the vertex. Thus the point with the highest deviation along a sharp bend will be marked as a vertex.

Advantageously a dynamically alterable threshold is also included so that sharp bends as well as gentle curves can be marked if required by the circumstances of the situation and as decided by the higher level subsystem.

All of the other vertices in the contour map are also designated in this way and a vertex list is produced comprising vertex description for all of the identified vertices in the contour map.

SKETCHER SUBSYSTEM

The vertex lists as produced during segmentation only contain the properties relating to each vertex. A further process is provided to describe the relationship between each vertex with those connected to it, by tracing the path along each of the connections and determining the relevant information pertaining to the path. In the simplest form, the connection between one vertex and another can be viewed as a straight line and the distance between one vertex and another is therefore the straight line pixel distance. However, the connection between one vertex and another is not only limited to straight lines but also includes arcs and higher order polynomial descriptions or curves. The description of a vertex list for straight lines has already been discussed, an example of the connection parameters of an arc is, Curve type, x centre, y centre, radius, alpha, beta, (index(index)), . . .

where curve type denotes the type of curve to be an arc, and x centre, y centre and radius define the centre and radius of a circle, of which the arc is a segment, in image coordinates. Alpha and beta describe, in angular representation, the start and end points of the arc. The provision of indices allows pertinent information to be added as and when necessary. The indices usually contain colour information associated with curves that are found. It is also preferred that the curve list is linked to the vertex list in order to enhance searching for relevant information by the higher level subsystems.

Figure 11:
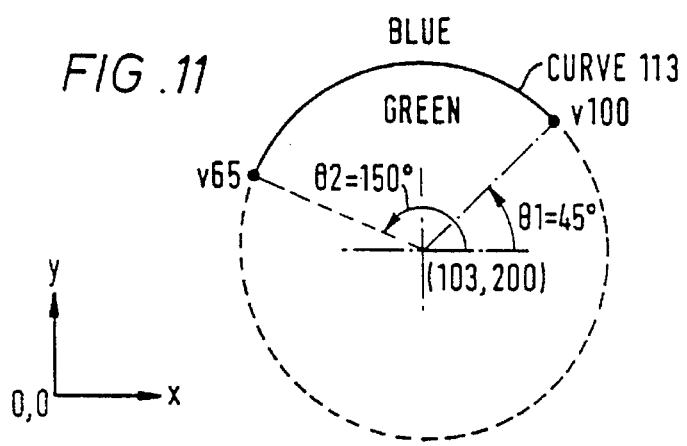
FIG. 11 shows an example of a detected arc.

FIG. 11 shows an example of a curve which is described by the curve list:

Curve 113: 1, 103, 200, 50, 45, 150, [GREEN, BLUE,] [v100, v65] . . .

In this list the number 1 identifies the curve as an arc with centre (103,200) and radius of 50 units; the starting point begins at 45 degrees counterclockwise (or equivalent units) from the horizontal and ends at 150 degrees counterclockwise from the horizontal; and v100 and v65 points to the two vertex points that form the start and end of the curve.

It is important to note that the vertex list and curve list contain only minimal information about the vertices and their connection relationship. If at subsequent stages further information about the original image is required, it can be obtained by referring to these two lists. For instance, the perimeter of a rectangle or box described by four vertices connected by straight lines can be found by adding up the magnitude of distances between connected vertices. Other features such as area, centroid, regions, colour patch and so on can also be found by analysis of appropriate information by the recogniser subsystem.

Higher order curves can similarly be described but obviously contain a longer parameter list. An example of a higher order curve is one which can be described in terms of a cubic spline. The descriptive format is generally the same, namely:

Spline type, start, end, (index(index)), . . .

Initially, the conductivity parameters of all vertices are determined by tracing all connections between all vertices. However, subsequent cycles of processing need not include the determination of all vertices but only those of interest.

The determination of the parameters describing the location of vertices are performed concurrently across the whole image by exploiting the inherent parallel nature of the hardware architecture of the Early Vision Module. Furthermore, the connecting relationships are simultaneously determined with the parameter describing the location of vertices.

Means are provided so that the concurrent processing can be performed using three different techniques. The first technique is to allocate areas of responsibility in overlapping image space to each processing node. However, two vertices may be connected by a path crossing more than one processing node which in this context is referred to as a global connection. Local connecting describes connections beginning and ending in the same processing tile. In the case of global connections, additional processing is performed to ensure that the vertex and curve list refers to global connection properties. This processing stage checks every vertex that is located on the boundary of the tile for a corresponding vertex in the adjacent tile. If a corresponding vertex exists in the neighbour tile, the two vertices are either merged into one after updating the vertex list, or removed from the vertex list after ensuring that the other vertices connecting to these two vertices are updated. For instance, if a line crosses three tiles and the length in each of the three tiles are 10, 34 and 5 pixels, the global length is 49 pixels long.

Figure 12A:
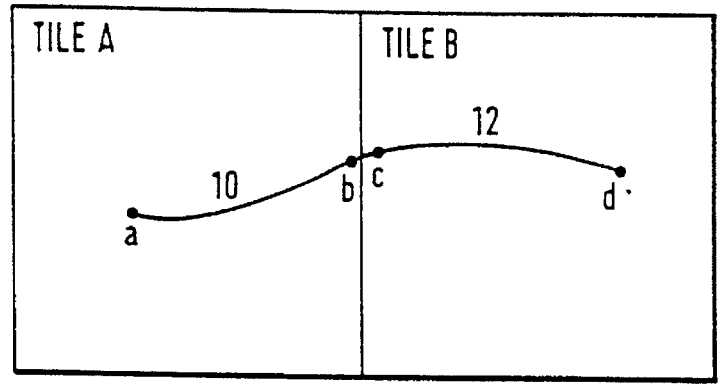
FIG. 12(a) shows an example of local line definitions describing a global line, and 12(b) shows a decision making process for defining a global definition of the global line.
Figure 12B:
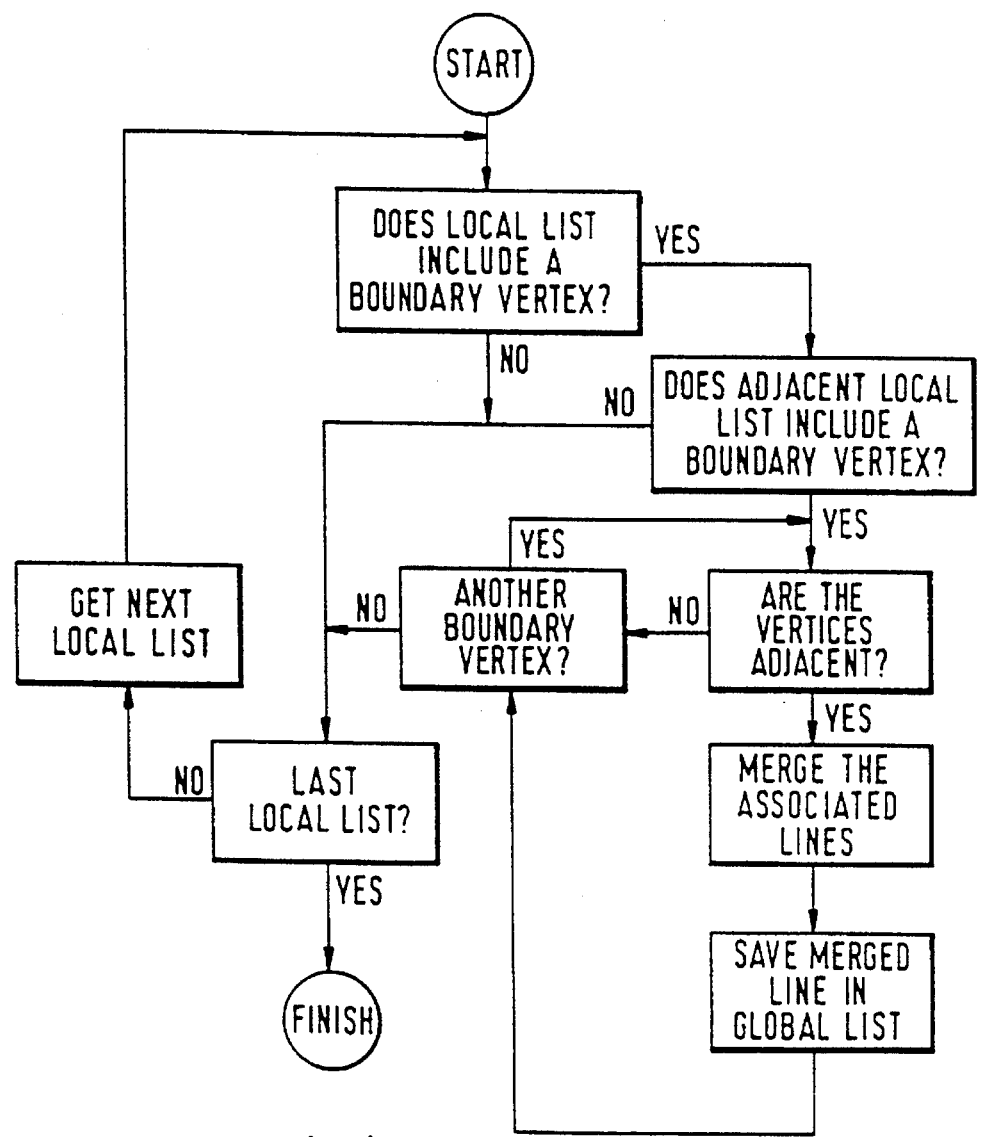

FIG. 12(a) shows an example of one way in which the sketcher subsystem converts discrete local connection description in the form of local vertex lists into a single global connection description or rationalised vertex list and FIG. 12 (b) shows the associated decision making process. In tile a, a line of length 10 which connects point a to point b has been detected by the sketcher, and tile B a detected line of length 12 connects point c to d. The sketcher subsystem examines point c and point d and, since they are adjacent, decides that the local lines a-b and c-d relate to a single global line a-d of length 22 pixels.

Figure 13A:
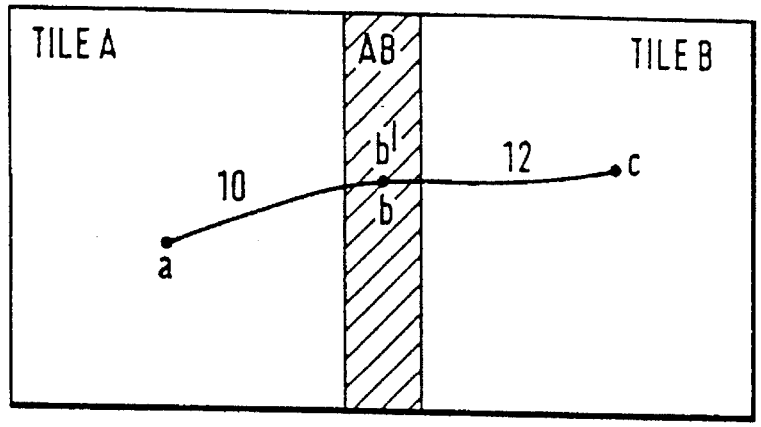
FIG. 13(a) shows a further example of local line definitions describing a global line, and 13(b) shows the preferred decision making process for defining the global definition.
Figure 13B:
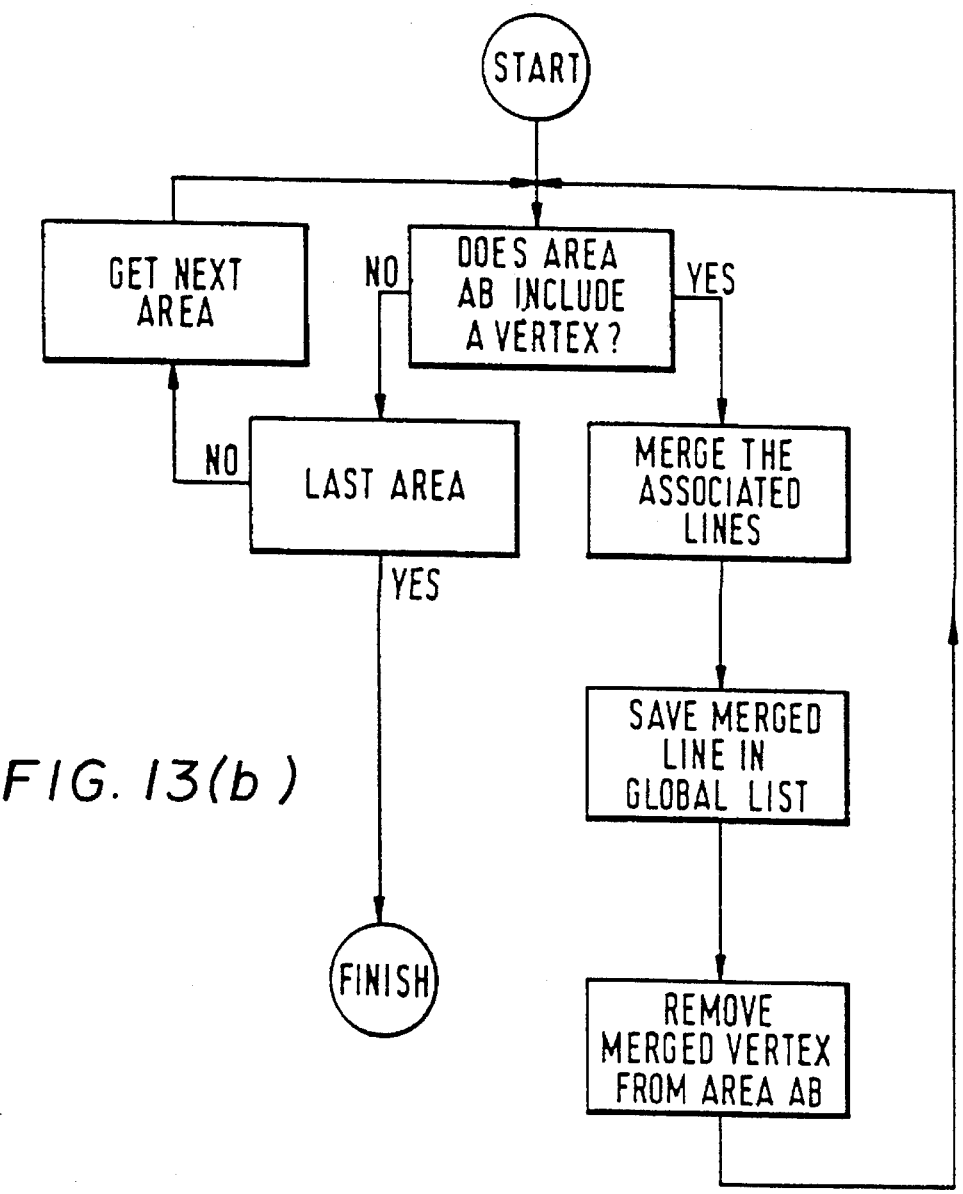

FIG. 13(a) shows a further example in which the sketcher must identify a global relationship from local descriptions, and FIG. 13(b) shows the preferred decision making process. In this example, tile A and tile B share a common portion of image where they overlap. A line of length 10 has been identified by the associated processing node as extending from coordinate point a to co-ordinate point b, and a line of length 1 has been identified as extending from coordinate point b' to co-ordinate point c. As is shown in FIG. 13(b) the sketcher subsystem recognises that the point b in tile A and the point b' in tile B are in fact the same point and so merges the two locally descriptive lines a-b and b'-c to form a global line description extending from co-ordinate point a to co-ordinate point c. As a result of this analysis all of the discrete local descriptions are converted into a single rationalised global vertex list.

Alternatively, each processing node can share a common image memory, simultaneously finding vertices and the connecting relationship of these vertices, and removing these vertices and their connections from the shared image memory so that vertices are not duplicate in the vertex and curve list. Ambiguous relationships due to multiple processing nodes following different portions of the same path are also merged into one path by subsequent processing.

In a third technique, each processing node can have its own duplicate image and by communicating with other processing nodes wherever a vertex is found, vertices are not duplicated in the vertex and curve list.

Provisions are made for any or all three techniques, however, the first solution whereby each node is allocated its own image area of responsibility is preferred. This first technique is preferred as it minimises the amount of communication between processing nodes as well as minimising the memory requirement for storing duplicate images; reducing communication between processing nodes increases the execution speed.

OPTICAL FLOW AND TRACKING

Optical flow methods used to determine movement between consecutive images by tracking the movement of each pixel within a first image to the respective corresponding pixel in the next image. Optical flow is able to generate more feature information, for example information relating to smoothly changing curved surfaces, than a simple feature extractor. The main use of optical flow is to enhance the operation of stereo routines which extract information derived from features in the image such as edges, corners, etc., whilst optical flow gathers information about smoothly varying areas.

Figure 14:
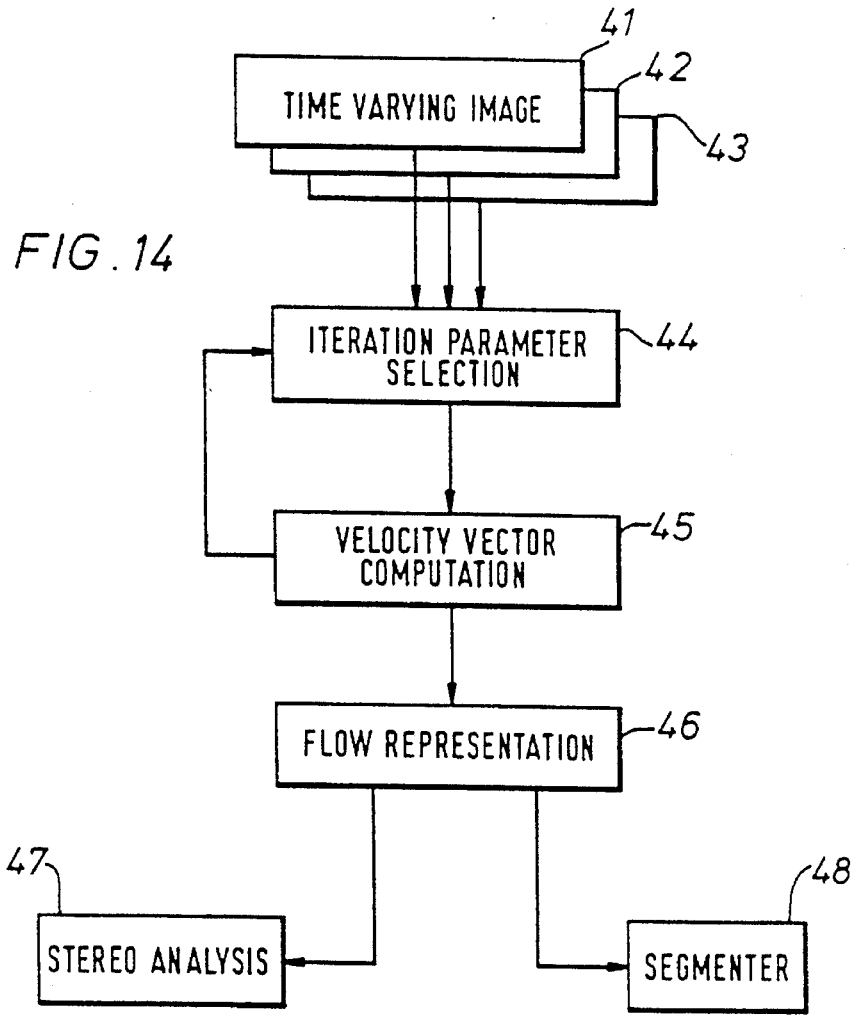
FIG. 14 shows a block diagram of an optical flow process.

FIG. 14 shows the optical flow analysis of consecutive time varying images 41, 42, 43.

The initial step of optical flow analysis (not shown) involves resolving pixel brightness to 8 bit accuracy (ie. 255 levels). The brightness level is used to identify corresponding pixels between frames.

To reduce computation overheads, the optical flow analysis is normally confined to a comparatively small picture area and comparatively small spatial movement between images when possible, though it is possible to calculate optical flow for complete images. By careful selection of the iteration parameters 4 in accordance with the size of the picture area etc. computation overhead can be reduced still further. Once similar pixels have been identified in two consecutive picture frames a velocity vector, 45 is created between the two pixels to present the direction and magnitude of the optical flow 46. The vectors thus obtained can be further analysed to yield information about e.g. range relationships, surface contours, etc. This further analysis may be carried out at the stereo analysis stage 47, or by the segmenter 48 which may use the optical flow data to decide e.g. what values to assign to the parameters a, b, c, d, e in the kernel.

For most applications, the complete cycle of processing is not required at all times. This is especially true when the object of interest is stationary with respect to the robot and after the object is recognised and mapped in three dimensions. An example of this is during the final approach of the robot in a pick and place exercise. However, as an added safeguard, tracking is required to ensure that if the object of interest has been moved independently of the operation of the system, since the last processing cycle, the trajectory of the robot arm is modified in real time to cope with these changes. In addition, tracking as a low level function is able to signal to the higher levels, in the form of for example an interrupt or an exception, when the position deviation is above an accepted tolerance or when the unforseen occurs, e.g. an unexpected intrusion into the robot working envelope. Detection of intrusion will require tracking of all segmented regions without the need for recognising these regions prior to the intrusion.

An example of a low level tracking function incorporated into the system is the use of cross correlation and similar algorithms. The controller system additionally includes the feature of tracking in colour. For instance, tracking with colour will involve the correlation of colour images as two dimensional image regions or one dimensional image stripes or colour coded features (vertex lists, curve lists and points, or permutations of these three compressed data list).

An example of comparison in the simplest form would be to take the absolute difference of the original signal and the signal to be compared against in all the three image planes, weight them separately and add them together for the final result. This is repeated against different signals and the best match is the comparison giving the lowest final result.

Cross correlation is an extension of the comparison test and is described in standard signal and image processing texts. An example of an application using cross correlation can be found in "A vision system for the identification of motor car headlamp reflectors for robotic assembly", P D Chuang and J P Cosmas, Robots and Automated Manufacture, IEE Control Engineering, Series 28, Paper 17, 1985. The invention includes a cross correlation feature, which has been found to be highly successful, of examining the correlation indices of each of the red, green, and blue image planes individually and weighting the results of combinations of these three image planes. Alternatively, images can be correlated by using hue, lightness and saturation as the three colour coded planes.

The cross correlation techniques employed include minimum mean square error and Euclidean distance measurements. Monochromatic images are simply image planes with the same red, green and blue pixel values and so the same techniques can be readily applied to monochrome images as well.

To increase the efficiency of tracking, the previous positions of the elements to be tracked are stored in the memory of the system so that the expected trajectory of these elements can be determined. This allows a reduction in the search area while still maintaining a high degree of success and consequently increases the execution speed of the system as a whole. In this embodiment, a Kalman filter is used as a trajectory prediction tool as well as first and second order extrapolation techniques. A description of these techniques can be found in "Vision-Based Predictive Robotic Tracking of a Moving Target." Hunt and Sanderson, Department of Electrical Engineering and the Robotics Institutes, Carnegie-Mellon University, Pittsburgh CMU-RI-TR-82-15 Jan 1982.

Another feature provided within the system is the ability to use compressed image data, for instance spatial differential energy (SDE) or image profiles, to increase the speed by which moving objects are located. The SDE technique is described in detail in the paper, "Spatial differential energy for the detection and location of multiple moving targets", P D Chuang et al, IMechE C373/86, 1986.

The use of a flexible frame store and concurrent processing with transputers allows different objects, or different parts of an object, or different regions of interest, to be simultaneously tracked under software control with nearly the same efficiency as tracking only a single object of interest. This is because the only processing overhead is the minimal time required for transferring a datum, ie. a point of interest, to each of the transputers. Because of the minimal time required to transfer the datum the overall execution time remains substantially unaffected. At a higher level, tracking is performed concurrently on extracted features, for instance, colour regions, centroids of objects, boundaries of segmented objects and so on.

Efficient tracking also allows the use of motion parallax to determine range information by the use of successive image frames, or frames from different displaced camera sources. By knowing the movement of the regions of interest or features between one frame to another, range is determined if the robot movement is known in any of the six axes for a six axes robot.

Low level colour or monochromatic tracking thus allows simultaneous range determination by motion parallax and triangulation with two or more image frames either concurrently acquired or separated in time. The mechanics of motion parallax and triangulation as software techniques are described in most image processing texts and will therefore not be described in any further detail in this specification.

RANGER SUBSYSTEM

The ranger produces depth, ie 3-dimensional, information about the real world from the 2-dimensional image data passed to it from the EVM. The vertex list, used in conjunction with the curve list, must be sufficiently detailed to enable the range to identify and locate well defined points or paths in a succession of 2-dimensional image data. By using these lists as well as information derived from the tracker subsystem and the higher level subsystem such as the recogniser, the 3-dimensional information obtained from stereoscopic analysis is far superior to systems using only a proportion of the information provided by individual subsystems.

In general, stereoscopic transformations, similar to triangulation methods used in navigation, are applied to the data in order to determine the 3-dimensional space coordinates of the features of the images.

Means for automatically calibrating the system are included which obviate the need for the position, angles and characteristic of cameras to be fixed or predetermined.

The movement of an object in the field of view of a camera mounted on the free end of the robot arm can be regarded either as movement of the object or as movement of the camera depending on the frame of reference. An important implication of this is that, if the object is taken as the frame of reference and the camera moves relative to the object, a single camera can be adapted to provide stereoscopic information merely by changing the position of the camera between successive images. Multiple view stereo provides more accurate information than information derived merely from two views, such as would be obtained by having two cameras secured at a fixed relative baseline.

Usually there is something in an image, such as a cross painted on an object in the field of views, which can be used as an artificial datum and can be centred in the image by moving the robot arm. It is usually possible to measure with ease the number of pixels that the object has to be moved (in whatever direction necessary) in order to centre the object. However, the controller does not normally know how far to move the robot in the required direction in order to achieve the task of centering the object in the received image. If the communication between the various modules of the system were faster and additional processing capability were made available, the movement of the robot arm could be monitored by a constant image monitoring process. Alternatively, the problem of self-calibration can be solved simply by moving the robot arm through a small known distance and monitoring the change that occurs in the image as a result of the small movement of the arm. Once this calculation has been performed it is then possible to calculate how far the robot arm has to be moved to achieve the desired centering of the object in the image.

For example, assume that the object to be centred in the image is displaced from the centre of the image by a distance of 24 pixels, and that the robot arm is moved 1 degree towards the object resulting in a shift of the object image by 12 pixels within the received image. From this information it can be seen that to shift the object by 24 pixels within the image one of two tasks can be performed, namely: the robot arm can be moved another degree towards the object, thereby covering the remaining 12 pixels; or the robot arm can be moved back to its original starting position and then moved the full two degrees to achieve the desired centring of the object within the image.

In spite of the obvious increase in overheads required by the latter alternative, this is the preferred method since it allows for more accurate self-calibration since the robot arm will move in two different directions during the operation. Of course, in addition to determining the distance required to move an object on the screen, the system requires information relating to, for example, the pitch and the yaw of the camera located at the end of the robot arm.

When an image if shifted as a result of moving the robot arm, it is necessary to measure the extent of the image shift (in pixels). Preferably image shift is measured in the following way: part of an image is collected and stored in a first array, the part collected is normally a straight lane of pixels representing, for example, an edge on an object of interest on the image; the robot arm is then moved and the same area of the new image is extracted and stored in a second array. Since the object of interest will have moved within the image, the pixels stored in the second array are different to the pixels stored in the first array. However, by careful selection of the size of the images stored in the arrays and the degree of movement performed by the robot arm, it is possible to ensure that at least part of the information stored in the first array will appear in the second array.

Once two suitable arrays have been formed, the arrays are matched to one another by determining the coordinates of corresponding points within the two arrays and the shift between these points in the two arrays is thereby determined.

Where the received images are in colour, the colour components are first converted into a scalar quantity and the two arrays are passed over one another in a pixel-wise shift, with the differences between the array elements being squared and summed for each pixel-wise shift. The arrays are deemed to be matched when the shift associated with the minimum squares sum is found.

In this way the distance, in pixels, between the same point in two separate images is determined. Since the system controlled movement of the robot arm from the point at which the first image was received and the point at which the second image was received, all the information required to determine the relationship between movement in object space and movement in image space is available.

It has been found that the above mentioned minimum squares sum approach to matching corresponding points into images tends to produce results which fall short of the actual distance moved between images. However, by repeating the operation a number of times in a recursive manner, such inaccuracies can be significantly reduced. It will be appreciated that in calculating the relationship between movement in world space and movement in image space, the characteristics of the camera, and in particular the characteristics of the lens, must be taken into account in order, to compensate for any magnification or other distorting effects.

Stereo analysis by definition requires more than one view of an object to be identified. However, the number of views required is generally regarded to be less than ten. The stereo analysis methods adopted in the controller system comprise several concurrent stereo computations as well as tracking and matching operations on keypoints such as edges and/or vertices of datums in each of the available views. The identified vertices in each view are finally matched to produce a 3-dimensional geometrical object description which may be used at higher levels in the system for object recognition and task planning.

One technique for extracting stereo information from two-dimensional images utilises motion parallax information and simple triangulation to extract range information. This technique, however, requires a priori knowledge of the camera movement unless of course the base lengths separating two or more cameras are fixed or predetermined. This requirement can be a disadvantage as the system needs to know to a great degree of accuracy where the camera is and in which direction it is pointing. This naturally means that the robot has to meet the accuracy demanded by the ranging subsystem.

An alternative or complementary approach to stereo analysis is to use an object known to the system, which is called the calibration object, for extracting three dimensional information from the image. Provided that the calibration object is within the field of view of the camera, any visible object within the same image can be mapped in three dimensions without the need to know in great detail where the camera is. This information is inherent in the calibration object image. For the same reason, it is not necessary to know the optical parameters of the camera system at the time the image is acquired. The use of this calibration object technique means that the robot need not be designed with a high degree of precision in terms of global positioning and an inexpensive robot can be guided by vision to perform the same task while still maintaining a high degree of three dimensional precision.

The concept of the calibration object need not be restricted to a single and fixed object. Once the dimensions of another object is mapped with reference to the calibration object, the new object may be assigned as the calibration object and all other objects and their coordinate systems may be referenced to this. Thus the field of view need not be constrained to always include the originally known calibration object. However, error is accumulated at each stage of referencing. Alternatively, numerous calibration objects within the working envelope can be used. The important point here, no matter which technique is used, is to ensure that the system is calibrated sufficiently accurately for the robot arm to be moved relative to objects and to manipulate the objects in the execution of a predetermined task.

An example of the advantages of integrating both motion parallax and calibration object techniques, is to position the camera at a predetermined position and then to confirm this position by referring to the calibration object in the field of view of the camera. In the unlikely event that the robot position is unreliable, for example after an unexpected collision, referring to the calibration object will give an indication of its position which if desired, can subsequently be verified by motion parallax techniques and so forth.

As has already been mentioned, it is possible to use image features that reference other image features in a complex way. To see why this is necessary consider a line drawing of a scene. The drawing can be defined in terms of the types and positions of corners, the lengths of line connecting them and which corner is connected to which. If this line connecting information is missed out, the scene cannot even approximately be re-created since much information will have been lost. The requirement to allow this referencing however greatly complicates the program. The problem is that not every feature in every view will be recognised. The references will therefore include references to other features that the program does not know about. The "unfilled" references must be dealt with in a very reliable way if the program is not to descend into chaos.

The above described method of presenting image information provides a flexible way of representing images. The number of feature arguments can be changed when the system is being set up and not all features need to have the same number of arguments. The routines are preferably modular so they can easily be re-written for different types of images.

Hierarchical feature matching is necessary to prevent an unimportant feature, possibly just noise, being matched with an important feature central to understanding of the scene. This could happen for example if a noise spike occurred at exactly the same position as an important feature in another frame. The problem is alleviated by sorting both frames to be matched so that "most important" nodes are at the start of each list. Matching is then done starting from the top of both lists. In this way important nodes are matched with other important nodes first before a match is attempted with noise spikes and the like. The routine for sorting in order of importance is separate and can therefore be changed easily for different definitions of "importance".

The optimum number of views to obtain three dimensional information in any particular case can vary widely and the maximum number of views is therefore chosen by the user when the system is being set up, the user taking into account factors such as the number of objects in the work area and the form of the objects. Using many views increases memory usage but increases accuracy. The number of views must also be variable during execution because some views may not contain a feature which the system is trying to identify. Tied in with this is the problem of using the available memory space to best advantage. Once a feature has been lost it is very unlikely that it will be regained and three dimensional data is therefore calculated if possible and the memory used by this point is freed.

Figure 15:
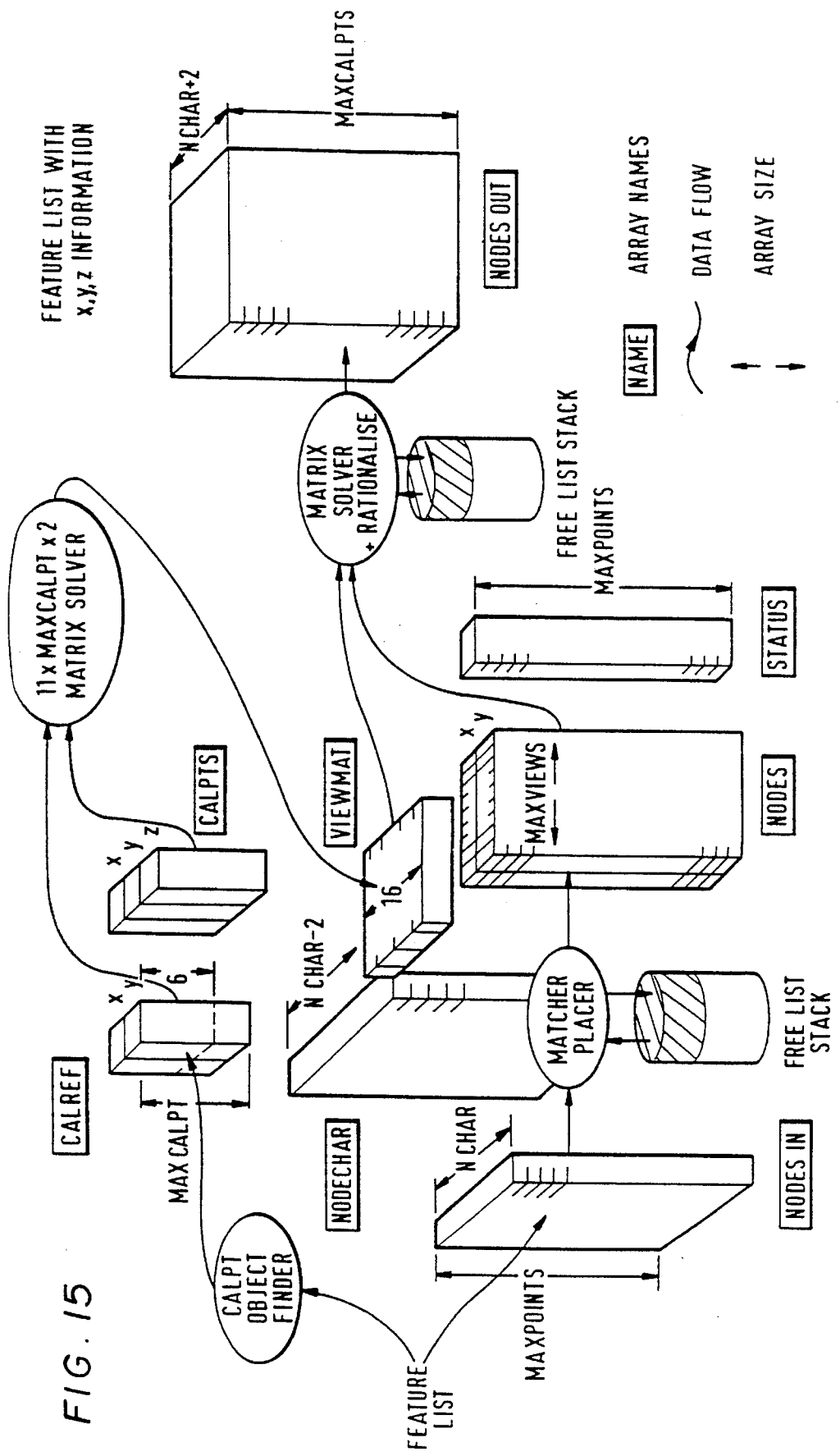
FIG. 15 is a block diagram of the data flow in constructing stereo information using two dimensional images.

The multiple view stereo algorithm will now be described with reference to FIG. 15. The exact shape of the calibration object is first read in as a prerequisite for any three dimensional routine. The maximum number of views before data is calculated and memory freed is entered. (This must be the same or less than the value MAXVIEWS). Two parameters used in the matching are then entered. The details are dependent on the particular matching algorithm used.

Slightly different actions must be performed for the first view. For example there is nothing to match the first view to, so the first time round the program is therefore executed as a special case before the main program loop is entered. The operations are performed by the algorithm are: identify which features are which point on the calibration object, get the data for the first view, fill the camera matrix and finally sort the "nodes" (e.g. features) in order of importance. Because a sort has been done on the data the references to calibration object points are now wrong so a new correct set of references are computed. The stacks used are then all cleared and a special purpose routine which is called only once in the program then copies the data in for the first frame into the large data arrays used to store the multiple view data.

The routine from this point onwards runs for every new frame that comes in. The routine will terminate when there is no more data to read. The next set of operations are similar to those for the first frame. The number of matches made for this frame (TOTMATCH) and the number of three dimensional points generated for this frame (N3DPTS) are set to zero and the frame count (FRAME) is incremented. As before, the data is read in as are the references to the calibration object. The data is sorted and the camera matrix is filled.

The next major block is the matching operation. If every point in the incoming data was tested as a match for every point already in memory the process would be unacceptably slow. A rapid method is therefore used to obtain a table of possible matches. The data is already sorted in x and y position. Any match must be close in x and y position. For every point the point closest in x is found by binary search of the data and then points within a specified y distance are added to the table. The distance used for this possible search area (SEARCH) is set when the system is being initially set up. The routine returns, as well as the table, the number of entries in the table. Of course if this number is zero then no match is possible and the routine jumps the next matching processes. A final routine is then executed to do the final matching from the table. This final routine can be completely changed for different circumstances and can be quite complex because it works on a small subset of the data.

When a match is found, the data is moved from the input array to the accumulator array and it is removed from the input data, and a list is kept of which nodes have been matched with what. This list is necessary later when references made about one feature from another features must be rationalised.

If no match is found but at least two data points have been accumulated, ie. enough to get three dimensional data, the three dimensional data is calculated and the position in memory used by this data is put on a free list stack. If any node for which three dimensional data has been obtained references a node for which no three dimensional data has been obtained the reference is replaced with a self reference. It should be noted that data in the main array cannot be sorted easily for this matching process so another array is used as a look up table so that the entries can be examined in the right order.

The data in the incoming view will not all be successfully matched. The data that has not been matched might be new features not seen in previous views or they might be noise. The unmatched data is transferred to the main accumulator array making the assumption that it is new features. If it is noise, matches on subsequent frames will not be possible and the space will be freed.

By far the major computing time is spent in the actual matrix solutions of n equations in m unknowns and in the matching. Parallelism can be exploited in the matrix solution because many points will be calculated per view. These can all be done at the same time. It is also possible to write a parallel algorithm for linear equation solution though matching is much harder.

The feature list output from the Ranger 16 is data representing three dimensional object points including colour information. The Ranger 16 keeps an updated data structure of three dimensional information and only sends new information to the recogniser 18. The Ranger 16 can also provide the information about the third dimensions of a new two dimensional segmented image for use by the recogniser if this should be required in a given application. The data is preferably issued to the recogniser in the following format:

Ranger: x co-ord, y co-ord, z co-ord, u, v, index (index(index)), . .

Figure 16:
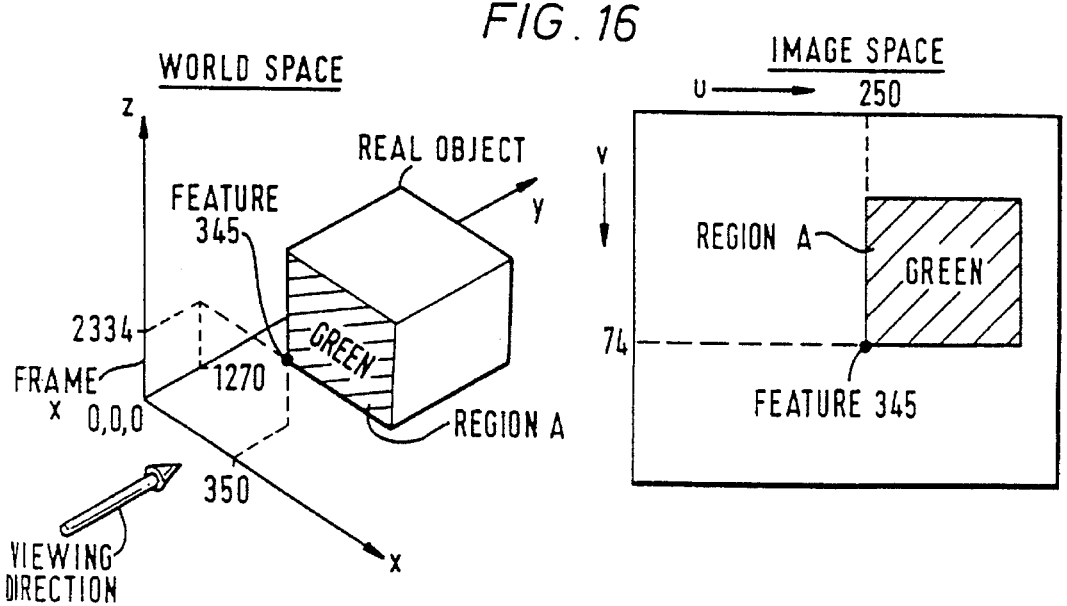
FIG. 16 shows the output of the range subsystem.

As an example, the output of the rangers, as shown in FIG. 16, for a data point or feature number 345 could be:

Ranger 345: 350, 1270, 2334, 250, 74, FRAME __X, REGION __A, GREEN, . . .

where 350, 1270 and 2334 are the coordinate values in millimeters away from the origin defined by the references frame FRAME__X. This feature in this example is also in REGION__A with a GREEN colour assigned to the feature. In general, a reference frame defines the origin of the coordinate system and the orientation of the coordinate axes by which every point in space refers to.

Thus the invention produces a unique way of finding three dimensional information by approaching the subject from two different and yet complementary techniques.

Range information in this context includes scale and perspective information in real dimensions, i.e., in millimeters or inches, and not just how far the object is away from the camera lens or simple estimates. The three dimensional information obtained by this method is as accurate as existing ranging systems using only parallax or triangulation methods alone. Moreover, the method is able to use both techniques concurrently to further improve the range accuracy. It is difficult to quantify this accuracy in real figures since accuracy simultaneously depends on the resolution of the imaging system, the optical parameters of the lens system and the movement of the imaging system; with the use of appropriate resolution, lens systems and base lengths, sub-micron accuracy is achievable. For example, if the imaging systems is an electron microscope or an optical interferometer, theoretical accuracy can be measured in terms of the wavelength of light.

In the controller system, real coordinates, such as the x, y and z cartesian coordinate systems, are easily transformed into any other coordinate systems, for example azimuth, elevation and range, using known coordinate transformation techniques. Furthermore, the chosen coordinate system may also be easily represented with respect to any reference plane. The reference frame representation is extremely useful in describing the scene with reference to any camera, or with reference to the robot coordinate system, to a predetermined space coordinate, to the end effector, to a calibration object, or to a point on the selected work piece. Coordinate transformations, using standard matrix manipulation techniques such as, for example, rotation, translation and so on, are thus simply switchable from one reference plane to another as required at different stages of the task.

As in all stereo and related image analysis techniques, the difficulty in matching the same features in different images in real time is considerable. The controller system solves the so-called correspondence problem in a novel manner. Instead of matching features which cam be widely separated in the corresponding image planes due to a large base length, the tracking subsystem is able to simultaneously track each feature, for example a datum feature, or image intensity, or colour region or permutations of these, when the camera is moving from one position to another by decomposing the actual camera movement into smaller movements so that matching of every corresponding feature of interest is simplified and hence more reliable. By fully exploiting the parallel hardware architecture of the EVM and the extensive use of the local and shared memory, three dimensional information is determined concurrently at any stage of the movement and not simply restricted to the first and final camera positions. Comparing the determined three dimensional information using multiple views will also remove erroneous range information by integration.

Thus in practice, a processing node within the EVM will have a number of features allocated to it, for example, datum features and/or image regions, for matching with or without tracking information, or information for other subsystems. Matched features are pipelined to the next processing stage. At the end of the matching sequence, the processing node will signal the planner and will either be allocated more data to be matched or perform another task if there are no more matchings to be done. As there are numerous processing cells in the EVM, matching is performed concurrently. Thus correspondence by matching is performed either on the raw image by cross correlation or similar techniques, or by a more efficient technique of matching points, lines, curves, or vertices describing lines or curves, or extracted features, e.g. area, centroids, colour regions etc. In any case the advantages of concurrency, whereby each transputer is allocated its own unique portion of image features and their parameters, are exploited for both matching purposes and subsequent stereo computations. The facility to match features in one image with those in any part of another image in the conventional sequential sense is also provided within the system.

At the end of this process, the three dimensional information so obtained from stereo and motion parallax are integrated with the three dimensional information from other three dimensional processes such as optical flow and shape from shading made available to the recogniser.

Figure 17:
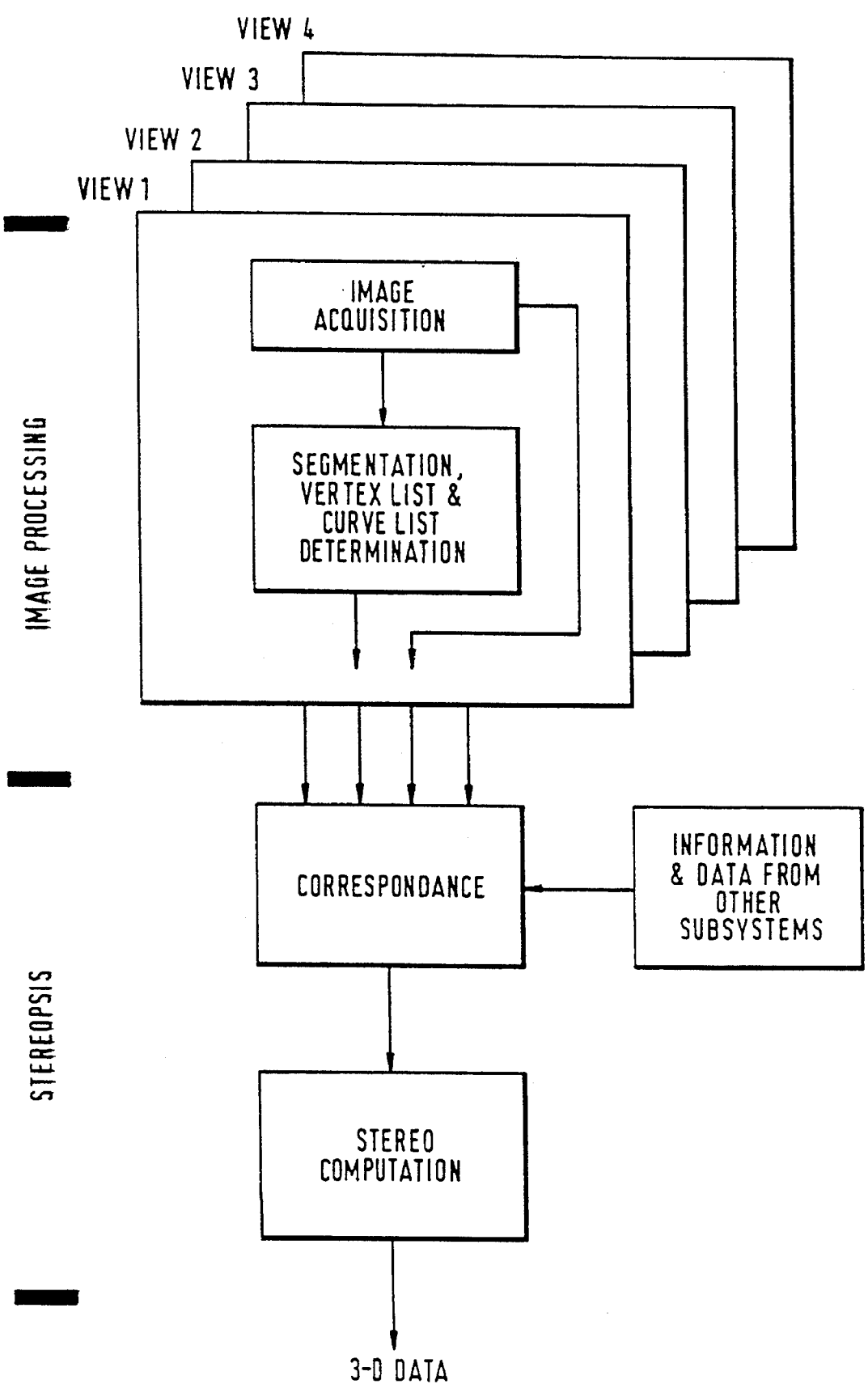
FIG. 17 is a schematic diagram of the preferred stereo analysis process.

FIG. 17 shows a generalised view of the stereo analysis process in which multiple views, view 1 to view 4, are initially processed using the above described image processing techniques of segmentation, etc. to produce curve and vertex lists, and the views are then compared to identify the features common to the views and three dimensional data relating to objects in the work space seen by the views is computed.

Figure 18:
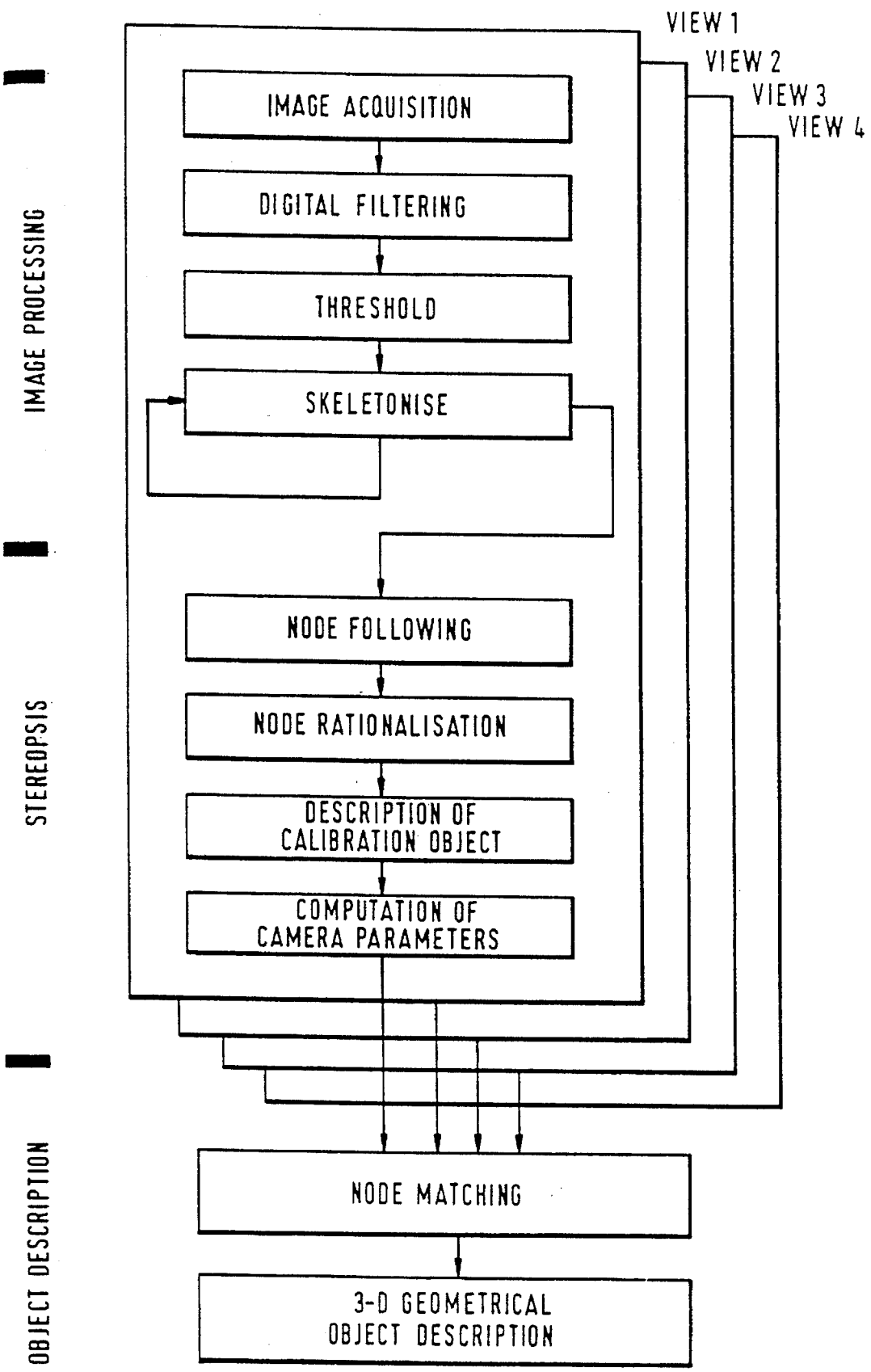
FIG. 18 is a block diagram of a further diagram of the stereo analysis process.

FIG. 18 shows a specific example of how the system extracts pertinent data from multiple views and uses the extracted data to derive a three dimensional geometrical object description. In the shown initial image processing stage the acquired image is filtered using the above described techniques and edges thus detected are used, if they exceed a predetermined threshold, to produce a skeletonised version of the image. This skeletonising stage corresponds to the edge detection methods described hereinabove with reference to FIGS. 8 to 13 of the accompanying drawings. Stereopsis is then performed on the skeletonised image and the resulting information from each of the four views is then compared in a node matching process to yield a three dimensional geometrical object description.

EARLY VISION MODULE HARDWARE

The camera 12, Segmenter 14, the Ranger 16a, the Sketcher 16b and the Tracker 16c, thus described give detailed three dimensional internal map of the scene and generate an explicit model of its local world. Together, these units combine to provide the Early Vision Module (EVM) formed from hardware designed to enhance the implementation for many of the logical operations performed by the system and described herein.

FIG. 19 shows the EVM hardware and how it is connected to other hardware components which form the overall system. The EVM hardware comprises a plurality of processing cells 80 and connects to a host computer 83 via a global bus 90 and a global bus interface 87. A host computer 83, which is preferably a MicroVAX computer provides performs the tasks required of the recogniser and planner modules. A VDU monitor and input keyboard 13 is optionally provided to enable a human operator to control the operation of the system either to input control data, etc. during the initial setting up of the system or to input revised data or instructions during the system execution. The monitor 13 is connected to the system via a global bus interface 85.

The monitor 13 is preferably an IBM PC and is used purely as a host to the array; once the array has been set up in the required configuration by the user, the monitor no longer plays an active role in the operation of the system. The monitor is connected to one of the i-nodes and is used to boot the EVM hardware.

Image data produced by the camera 12 is initially stored in an area of memory, a framestore 85. The image data thus stored can be accessed by the monitor 13 for display should this be required by the user. The image data is divided into tiles which are then distributed to the processing cells 80 via the global bus 90.

The provision both of a global bus and nearest-neighbour inter-processor links, enables the EVM hardware to be viewed in two very different ways: as a system of communicating sequential processes, and as a shared memory multi-processor array. These aspects are complimentary and both are required to achieve the fastest performance. Sequential process inter-communication is a very efficient way of sharing data in the highly local operations required in image processing. However this inter-communication is far less efficient in transferring large blocks of data between remote parts of the array as is required when an image is broadcast from the camera as part of the initial tiling process. In the case of broadcast transmission of the image data, the global bus service provides an ideal medium. The global bus is also used as a communication medium when the EVM is assigned part of a computational task from the host computer (ie. the recogniser and planner). An example of such a computation is multiplication of the large matrices which are intermediately generated by the camera calibration algorithms described hereinabove. Each processing cell 80 will only calculate one inner product of the final result and to this end, although the whole matrix is broadcast to the EVM hardware, each processing cell will only receive those elements of the matrix required to calculate a particular inner product. Once the individual inner products that comprise the result matrix have been calculated they are returned to host computer by way of a broadcall operation (a broadcast in reverse) over the global bus. The broadcall operation is synchronised by the sequential process inter-communications.

FIG. 19 also shows the logical structure of the EVM hardware. The hardware comprises a plurality of processing cells 80, each cell comprising four image processing elements or i-nodes 82 and a connection element c-node 84. One of the plurality of processing cells, e.g. processing cell 81, has a supervising element or s-node 86 in place of the c-node 84. The s-node 86 performs the dual tasks of a connecting element and of a supervisory element Each i-node 82 is responsible for processing a segment of the image data assigned to it, and each i-node is logically connected to four adjacent i-nodes; three of these connections are via direct links 88, the fourth connection being indirectly via the c-node associated with the particular i-node.

As each transputer only has four links it is necessary for link adapters to be used so that the relevant transputers can talk to each other. The top four talk by use of a token ring. The message starts with the s-node and is sent round the ring until it returns. Each c-nodes then sends the necessary code/data to the i-nodes.

There is limited memory on the transputers with each i-node having 32 KW (kWords) of memory and each c-node having 96 KW of memory. This is sufficient for the c-Nodes to have access to a 256×256 pixel portion of the image at any given time and the i-nodes to have a 128×128 portion.

The four c node transputers are the only ones that have access to the VME bus. The other boards are the three framestores that are memory mapped as 256×512×16 bit framestores but are used by the system as 512×512×8 bit framestores. These capture the image from the camera. The information is processed by passing the data to the transputers and then back into the frame store when it has finished. There is also 1 MB of system memory (not shown) that is used to store the node list etc. before it is sent to the MicroVAX.

There are three distinct levels of operation. The i-node software is there purely to do the image processing operations and the i-nodes only connect with the rest of the system through their respective controlling c-node. The c-node software controls the four i-nodes associated with each c-node and communicates with other parts of the system to get the image data via the VME bus, and to receive commands from the supervising s-node. The s-node performs the same functions as the c-nodes and in addition it is also responsible for supervising all communications between the EVM and the host MicroVAX computer.

Thus, the c-nodes provides access to shared resources within the system, for example shared memory, by way of the global bus 90 which is preferably a VME bus. Therefore, any i-node has access to both any other i-node in the EVM and to any of the shared resources. The c-nodes are provided primarily to read the tiles of the image assigned to the four i-nodes in the same processing cell as the c-node, to perform simple pre-processing of the image data before presentation to the appropriate i-node. The pre-processing is executed by the c-node as the image data is read from the global bus 90. The s-node 86 in one of the processing cells 81 provides the same functions as that of the c-nodes and, in addition, it provides coordination for all "single-thread" operations involving communication of the whole EVM module with other parts of the system, for example, interfacing to the host computer, i.e. the recogniser, the planner and the image framestore. The coordination is achieved by way of a token ring 92 which threads all the c-nodes in the EVM to the s-nodes.

FIG. 20 shows how the various parts of the EVM are laid out on two types of separate circuit boards: Type 1 boards 94, and Type 2 boards 96. The type 1 boards 94 house the i-nodes 82 and each type 1 board 94 comprises eight Inmos T800 transputers, one for each node; each transputer having associated with it 32K words of static RAM (not shown). The type 2 boards 96 house c-node 84 (or an s-node 86), each type 2 board 96 comprises a T414 transputer with an associated 96K words of static RAM to provide c-node functions, a program controlled VME bus interface 98, and two memory-mapped Inmos link adaptors 99 which from a token communication network of private links between all of the c-nodes transputers.

In a large controller system such as this, with many different data communication paths and a great deal of inter-processor information exchange, there is a very real possibility that, in response to a small irregularity in operation, the EVM could fail catastrophically. Examples of such irregularities may include "deadlock" or "lockout" due to a failure in a single communication link or program corruption due to a power fault. To minimise the possibility of catastrophic failure the EVM includes a supervising process which runs concurrently, but at a lower priority level with the main image manipulation algorithms. The supervising process is contained within the ROM of the c-nodes so that communication across the EVM buses still takes place in the event of a link breakdown between the i-nodes or in the event of a program error occurring. The supervising process includes algorithms which analyse and reset failed i-nodes, reload the appropriate image data and restart the analysis carried out by the i-node.

When the EVM system is booted the program executes a number of set up procedures. It then goes into a management routine which starts the EVM hardware. Once it has been established by system checks that the EVM hardware is running correctly a boolean flag is set to true. The EVM hardware continues to loop through the controlling program calling various image processing routines until the MicroVAX sends a code to reset the boolean flag when the program stops.

The management routine waits for an instruction to be sent from the MicroVAX. It is then dependant on the instruction sent therefrom to call the relevant procedure. When it has completed the relevant procedure it sends back to the MicroVAX a return code that the command has been executed correctly. If the code sent is not correct then the procedure sends an error code back to the MicroVAX.

The procedures that reside on the s-node fall into two categories. The first are routines that are also on the c-node. This means that all four processors are needed to execute this. The first thing the process does is send a tag around the token ring. It then waits for the tag to be returned before it executes the actual routine. If it is a procedure that runs only on the s-node, such as grabbing an image, then the process is executed.

A controlling processor for the EVM is provided to operate at several different levels. The highest level of operation is illustrated in the routine in appendix A; the routine is in an informal OCCAM-type format. The main body of the algorithm is a sequential loop (SEQ) consisting of three phases of SEQ operations. The first phase fetches the current image from the c-node into the associated i-nodes. Next the current image is processed by the i-node and, in parallel (PAR) with this operation, the next image is read from the global bus and stored by the c-node. During this phase the whole EVM array runs the same part of the program simultaneously, eliminating the need to impose any message passing protocols onto the inter-node communication inherent in the system; The second phase of the algorithm outputs the results of the image processing operations performed by the i-nodes i.e. the vertex list, to the ranger if the Ranger has requested this information. The third phase of the algorithm activates the EVM operating system which monitors the system performance, handles exceptions, communicates with external devices, etc. Many of the operations in the third phase are in response to data input to the EVM from external devices so a message-based communication protocol is used. The third phase is kept as short as possible in terms of execution time since no image processing or other data manipulation operations can occur during this time. However, the exact time taken to implement the third phase is dependent on actual events that occur during the execution of all three phases of the EVM control process.

The EVM is coupled to the host computer which performs the operations provided by the planner and recogniser modules. At times a single-threaded control process is required to coordinate system wide activities such as transfers between EVM, the framestore, and the MicroVAX host interface. All functions relating to the control processes reside in the s-node, signals are passed from the s-node, through all the c-nodes and back to the s-nodes. A token generated by the s-node and handed down from c-node to c-node is used to ensure exclusive access to the bus by the c-nodes, and the return of the token to the s-node signals the completion of the global activity.

A request from the host for data is handled as follows:

(1) The host computer requests a DMA transfer and the interface hardware asserts a bus interrupt.

(2) The s-node (which is the only bus interrupt handler) handles the interrupt. When the output phase of operation is next entered, the s-nodes collects the vertex list from its four i-nodes and writes it to the MicroVAX interface (at this stage the MicroVAX is acting as the recogniser); then it passes a token to the c-nodes downstream.

(3) On receipt of the token each c-node outputs its own vertex list and passes the token downstream to the other c-nodes.

(4) When the token once again returns to the s-node, the s-node sends an acknowledgement to the interface to indicate that the DMA transfer is complete.

Similarly, the framestore is controlled as follows:

(1) At the start of the image processing phase the s-node polls the framestore over the bus to check that a new frame has been completely digitised and stored.

(2) If a new frame is stored the s-node fetches the image tiles for the four i-nodes in each of the cells and passes a token downstream.

(3) On receipt of the token each c-node fetches its four tiles and passes the token downstream.

(4) When the token returns to the s-node it initiates the transfer of the next image frame from the video input model to the framestore.

Appendix B and appendix C show the structure of the processes in an informal OCCAM-type format to perform these tasks.

In order to enhance edge segmentation and feature extraction in hardware, the image space is divided into equal tiles with a transputer (i-node) allocated to each tile. In addition, each transputer not only holds the image area or tile assigned to it but will also overlap into adjacent tiles. This feature helps to minimise communication between adjacent tiles during processing as well as reducing computational complexities along edges whilst still allowing concurrent processing. This feature also allows more of the above-mentioned image processing algorithms to be processed locally with minimal interaction between neighbouring tiles. The amount of overlap required will depend on the sequence of algorithms needed to perform a given task.

Figure 21:
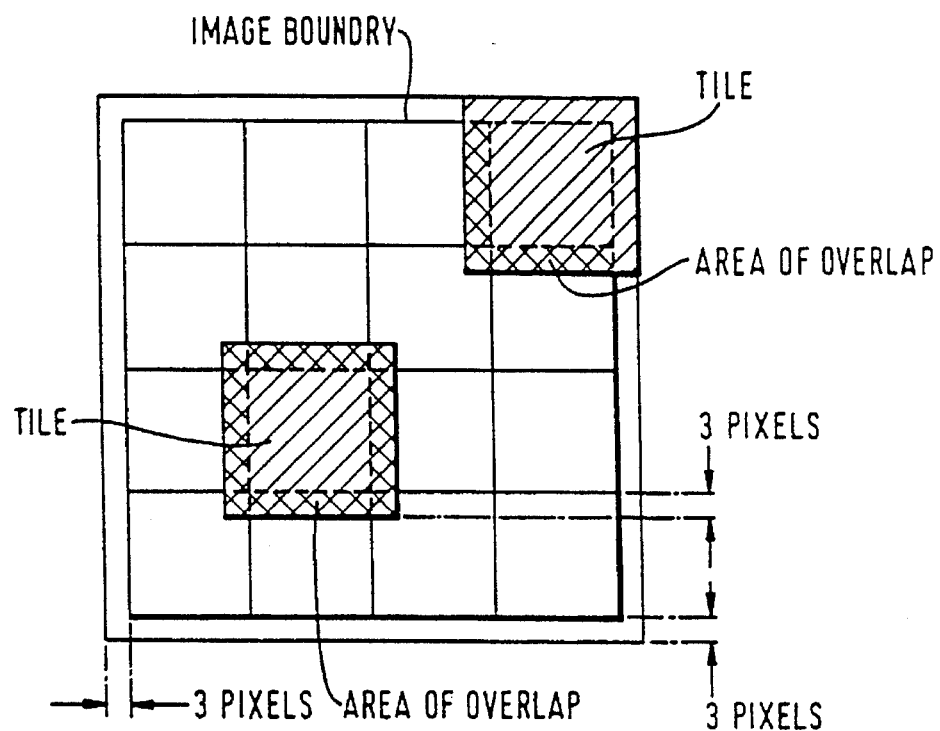
FIG. 21, illustrates how images are divided into equal tiles.

As shown in FIG. 21 the image is divided into 16 equal tiles—each tile is held in the memory of one transputer in the i-nodes i.e. each i-node receives one tile. The tiles overlap by 3 pixels in each direction provided no optional smoothing is to be carried out. If additional smoothing is to be carried out, then 3 pixels are added to the overlap for each smoothing operation.

All binary images are held in arrays of type integer and each element of these arrays holds 32 pixels of information as follows: a binary image of size 60×60 is held in a one dimensional array with 120 elements. This data structure allows another level of "parallelism"; for example to shift a binary image north or south will be about 32 times faster than if the image were held as one pixel per word.

RECOGNISER AND PLANNER

Processed information from the Ranger stage of the EVM is passed to the recogniser which applies reasoning to the geometrical, colour and other information to enable viewed objects to be identified from a suite of known object models.

Thus, the purpose of the recogniser is to interpret the image by suggesting which of a number of known objects may be objects in the image. The best way of accomplishing this is by knowledge based interpretation. This technique is normally directed towards interpretation of flat scenes, such as aerial photographs, landscapes, and scenes containing laminate objects. However, the fact that the EVM provide 3-dimensional information is of use here. A top-down recogniser is preferred with the logical decisions constructed in Prolog or another suitable language.

A top-down recogniser can answer queries such as "is a hammer in the picture, and if so, where?". The top-down recogniser has the advantage over a bottom-up recogniser in that a bottom-up recogniser needs more computation time to reach a logical conclusion, although, in its favour it is able to answer questions, of the sort "Which objects are in the picture?".

The advantage of using a top-down approach is that simple body models of known objects are easy to construct. Moreover, by using a high level programming langauge such as Prolog, the models can be constructed to have the appearance of grammatical rules. 3-dimensional body models are provided which can be transformed (i.e. rotated, translated and magnified) until the model most closely resembles a region or regions of the image under examination.

It is necessary to know in advance what)objects might appear in the image so that typical 3-dimensional models can be constructed. A flexible matching algorithm is provided, by the ranger in conjunction with the tracker, so that errors introduced by early visual processing are tolerated and so that dimensional variations in the actual objects viewed are tolerated and accounted for.

Reasoned decisions are passed from the recogniser to the planner which overviews the operations of the whole system. The planner decides how the robot arm is to work to execute the input command. For example if the command is "assemble part A with part B", the planner is able to decide that the first step is recognising part A and part B, secondly it must bring A and B into the same space domain, and thirdly it must orient A relative to B prior to the final assembly operation. To this end the planner controls operations, through the controller subsystems, at all levels: from driving the link servo motors in the robot arm to co-operating with the recogniser where recognition and reasoning about the world are taking place.

In addition to receiving reasoned decisions about the world from the recogniser, the planner receives task descriptions. The planner effectively controls all components within the system and makes intelligent decisions when exceptions, such as the intrusion of an unknown object into the robot arm workspace, occur within the system. Some of the outputs of the planner are signals which control actuators, via the controller subsystems, within the robot arm during manipulation.

When a task is first encountered, the planner with the help of the recogniser identifies the type and orientation of all of the important objects involved in the task in the object space. To achieve this, the planner invokes when necessary any or all of the previously mentioned functions provided by the EVM to obtain the fullest description of the objects in object space.

Higher level cognitive functions are provided in the controller by way of a set of specially developed expert system shells. Object recognition is achieved through the continuous comparison of extracted features from a set of images with those contained within a database of plausible objects, i.e. knowledge based object recognition. The database system is intended to be custom designed to meet specific users requirements by combining many of the features or tools described herein.

These tools may be divided into two categories; those providing functions relating to user interface and those providing functions relating to image processing.

The database system is supplied with a user interface allowing the user to update or modify the description of various objects within the database. This interface not only includes machine to human interfaces but also machine to machine interfaces.

As a machine to user interface the expert system, through a series of question and answer sessions, is able to guide an inexperienced user through the steps required to update or create new entries within the object database. By using conventional known artificial intelligence techniques such as those described in the Handbook of Artificial Intelligence by Bass and Feignbaum, the expert systems shells are able to tune themselves to the experience of the user. The system is also able to learn from real objects presented before the image processing subsystem by guiding the user through steps necessary to provide the necessary data to perform the task.

To achieve the speed necessary for real time assembly, the object database is concurrently accessible in real time by the vision system processing or i-nodes. This also provides means by which the expert shell can periodically alter the contents within the database. The databases can be inspected in real time by the vision system. This means that various subsystems contained within the system may be accessing the data simultaneously in order to achieve predefined tolerances of object recognition. The data base is therefore closely coupled to the underlying transputer system, which has been described in relation to the EVM hardware, and each transputer may be regarded as a user of the database because of the ability of the transputers to compare information concurrently. The inspection of data is coordinated by the database system. When a predefined number of transputers have all achieved their independent goal a system event will be generated. This event normally signifies that a globally defined goal has been achieved, such as the recognition of an object.

The database system itself is distributed amongst the transputers within the system and events will occur when a majority number of transputers have achieved their goals (this depends on the application and configuration of the specific system). The raw database is held within the host computer but receives continuous access from the transputers. The expert system shell interface to the database also runs on the host computer, thus providing a "multi ported database" which logically connects to the vision system and the user interface.

The database modification shell is optional, however the aim is to provide a general purpose user interface implemented as an expert system shell. This shell coordinates the entire operation at a user level by following a sequence of predetermined procedures. By implementing aspects of artificial intelligence, the shell is able to enquire of the user which of a number of assembly functions are required. A plan is subsequently formulated within the boundaries of the physical capabilities of the system.

The world model maintains a record of the state of the environment in which the entire system is working in the form of predicates with numerical data attached to them. Roughly speaking, the world model acts as a database which has a mechanism to make and update its contents automatically with the help of the Recogniser and object models.

The world model tries to form descriptions of the world as precisely as possible when it is given the information of the world. It returns the states of objects or the world as and when other subsystems require them.

Figure 22:
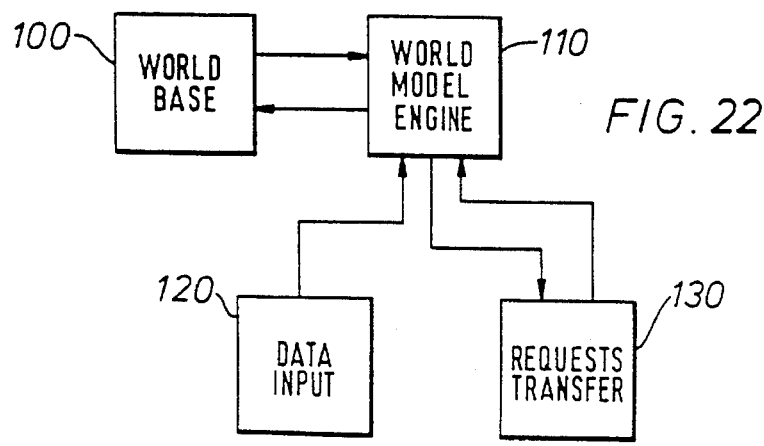
FIG. 22 illustrates the basic structure of the systems world model.

FIG. 22 shows the basic modules of the world model. The world base 100 is a database which contains information on the state of the world it is the main body of the world model.

The world model engine 110 handles the information stored in the world base to add new information, to update it and to retrieve needed data when other systems require them. All functions which manipulate the contents of the world base are implemented in this module.

Data input 120 accepts inputs from the Recogniser. It converts the inputs into a series of procedure calls to the world model engine 110. The world model engine 110 constructs consistent descriptions of the world in the world base 100.

Requests transfer 130 deals with requests from other systems such as the Planner. When requests transfer 130 is called it resolves the requests into queries to the world model engine 110. Requests transfers 130 deriving raw data from the world model engine by constructing a set of return values out of them in a form which is understandable by the requesting systems.

The other systems can access the contents of the world base only through requests to the data in the 120 and requests transfers 130. Hence the world base 100 and the world model engine 110 are concealed behind those interface modules, and cannot be called directly.

The main problems in representing object relationships are as follows: namely:

How should the world model be represented within the system;

What are suitable representations of relationships in the environment;

How should each relationship be constructed in accordance with the recognition process; and How should representations be updated during execution of tasks?

When a predicate describes relationship between two objects, it takes two arguments; and when it states a certain fact about an object, it can take one or two arguments Thus, the statement: "exist <object 1>", is a statement that object 1 exists; the statement: "is <object 1>, apple 1" is a statement that object is known as "apple 1"; the relationship: "apart <object1>, <object2>", identifies that the relationship between object 1 and object 2 is that they are apart (i.e. not in contact form each other); and the relationship: "on <object2>, <object3>", identifies that the relationship between object 1 and object 3 is that object 2 is "on" object 3.

The predicate "on" is a good example of what is implicit in a relationship. It is reasonable to assume that the relationship concerns objects under the influence of gravity. Therefore, the influence of gravity is expressed implicitly in predicates which are used in processes of constructing or updating the world model. No object on the earth can be placed in static position without supports from other objects. Of course, dynamically moving objects, such as flying aeroplanes, thrown balls, etc., can be ignored in the context of a manipulative task since robots will rarely be expected to cope with such problems.

In the interest of fast execution time it is not always favourable to implement each predicate only because it might be needed. In assuming the existence of a hierarchical structure in relationships between objects, an accurate definition of each predicate and a clearness strategy for constructing or update the world model and for planning tasks will automatically result.

During construction of the world model, the system executed updating processes and planning processes and the planner will compose or decompose predicates to grasp an understanding of the conditions of the environment. Each level in the hierarchy, obtained by compositions and decompositions of predicates, corresponds to each level of concern.

In order to achieve this, the number of basic statements and relationships, i.e. the lowest level of predicates, are restricted to a small number. For example:

statements:
 exist
 is
relationships of contacts:
 apart
 touch
relationships of positions:
 below
 above The planner can then compose other predicates using these predicates. For example the predicate: on <object 1>, <object 2> can be constructed from the two predicates:

touch <object1>, <object2> and
below <object1>, <object2>

Every time the system recognises an object in an image a set of predicates are generated and added to the current world model.

Figure 23:
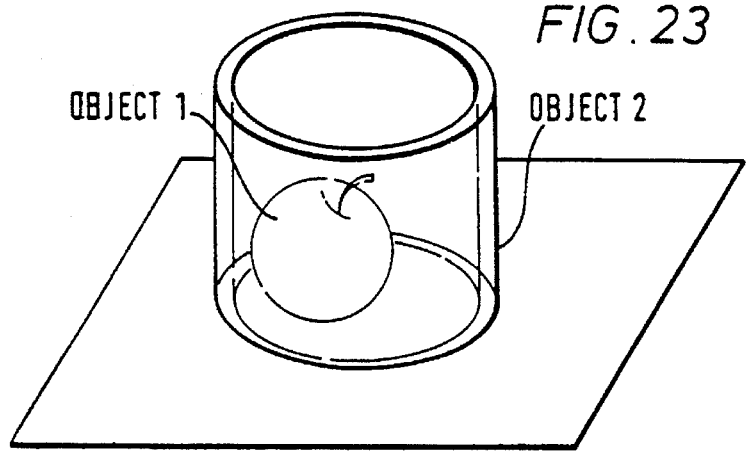
FIG. 23 shows objects upon which an exemplary task may be performed.

Consider the situation shown in FIG. 23 where an object, called <object1>, is detected in the image and from available information it seems to be an apple. This will result in the following predicates being generated:

exist <object1>
is <object1>, apple1
exist <object2>
support <object1>, <object2>

Each generated predicate may hold uncertainty. Thus, in the above example, the system does not know what <object2> really is nor what kinds of lower predicates "support" consists of. However the system is certain that <object1> cannot exist without any supports (because of the effects of gravity) and that at least one supporting object must exist. Of course <object1> is possibly supported by several other objects but at this stage this is unimportant.

Even if after further processing is done the system has not decided what <object2> is, there is no harm in the system regarding <object2> as a ground plane and even if <object2> is actually a table or as in the diagram a container, since this misunderstanding will not prevent accomplishment of the required tasks.

Figure 24:
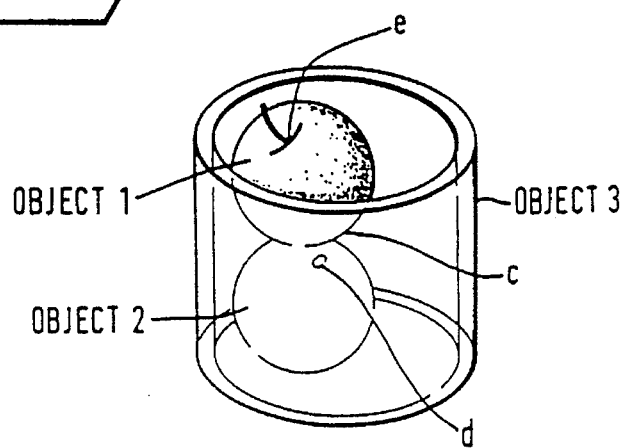
FIG. 24 shows objects upon which a further exemplary task may be performed.

Continuing the recognition process, the world model will grow to contain for example, the following statements and relationships about a situation shown in FIG. 24, namely:

exist <object1>
exist <object2>
exist <object3>
exist <object4>
is <object1>, apple1
is <object2>, orange1
is <object3>, bowl1
support <object1>, <object2>
support <object2>, <object3>
support <object3>, <object4>
touch <object1>, <object3>
apart <object1>, <object3> (at point c)
touch <object2>, <object3>
apart <object2>, <object3> (at point d)
touch <object2>, <object1>
apart <object2>, <object1> (at points d and e)

The last 6 predicates i.e. the "touch" and "apart" predicates in this case cause 3 conflicts out of 3 pairs of predicates. Thus, conflicting predicates will under some circumstances coexist. To overcome such conflicts each statement and relationship can be assigned a certainty weighting so that during planning, the system can continue to make decisions. The system regards several uncertain predicates as certain ones and thereby resolves existing conflicts.

At first, the operation of creating a world model is relatively slow since the recogniser starts with very little information, however, as time goes on the recogniser gains more information about the object space, and any activity will under most circumstances merely result in an incremental update of the object space data. For example, as a particular movement is being directed by the planner there should be no need to re-analyse the object space since this should remain unchanged apart from the results of the specified movement. However, an unknown object suddenly appearing in the object space, for example a human being walking in front of the camera, will result in the recogniser generating an exception resulting in the planner initiating a sequence of events which results in a new analysis being executed. Intrusions such as these are detected in real time by the tracking subsystem.

Figure 25B:
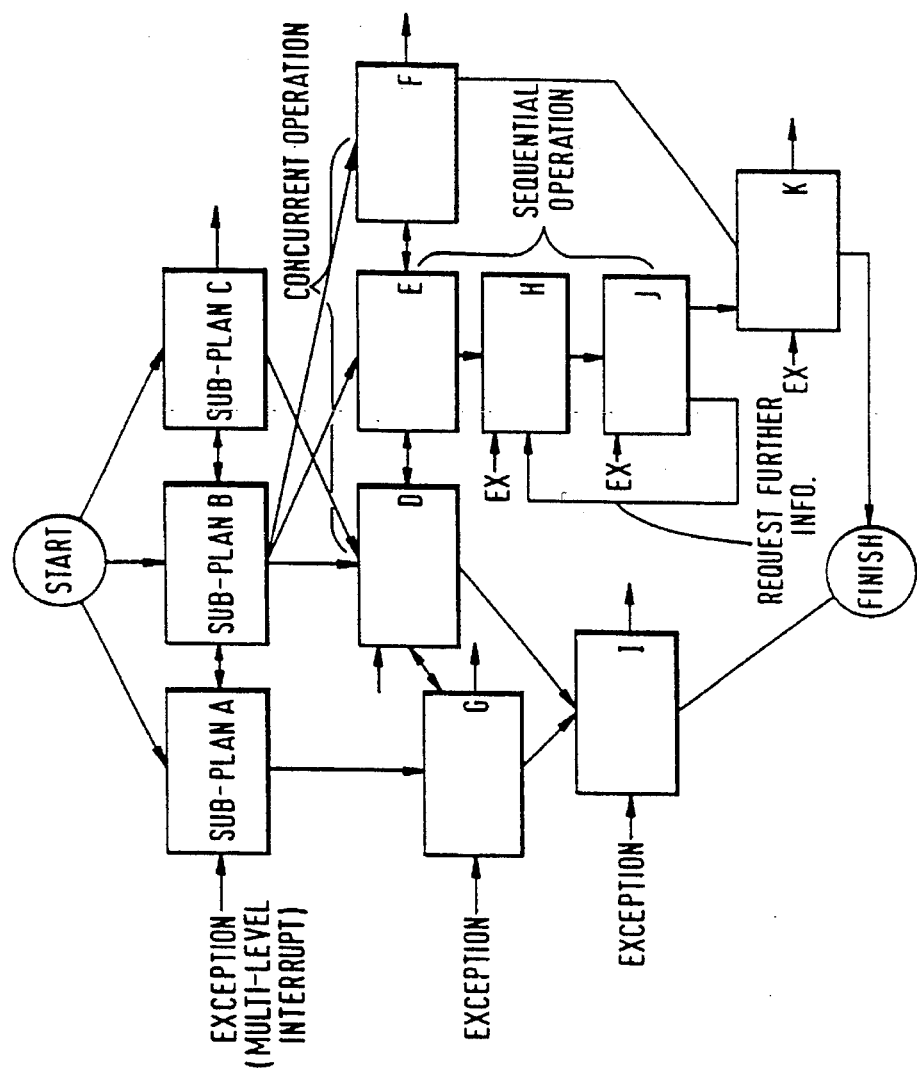
FIG. 25(a) shows a command task and 25(b) shows its decomposition into small tub-tasks.
Figure 25A:
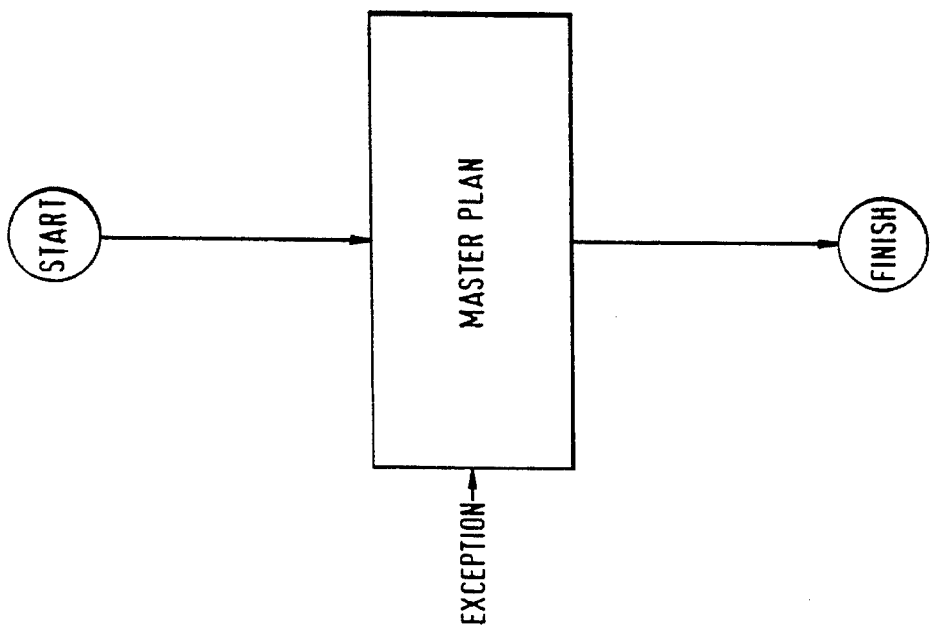

FIG. 25 illustrates an example of how a top level task, i.e. a command or master plan, is decomposed by the planner into a number of smaller subplans some of which can be executed concurrently and other of which must be executed sequentially. In the example the master plan is broken down into eleven sub-plans, A to K. Sub-plans A, B and C are executed simultaneously by the system. The completion of sub-plans B and C initiate the concurrent execution of sub-plans D, E and F; the completion of sub-plan A initiates sub-plan G. Sub-plans E, H and J are sequential, so the sub-plan H operation will not start until the sub-plan E operation is completed.

Each sub-plan can be interrupted in the event of an exception occurring, and each sub-plan is in turn capable of generating an exception, or interrupt, signal in the event that an unexpected information input or result output occurs during the execution of the sub-plan. Moreover, means are provided which enable sub-plans to request further information from, or repeated execution of, a previously sub-plan in the case of insufficient information.

When a top level task is invoked by the user, the system must break down the task into sub-components, until eventually individual robot manipulations can be scheduled. all simple manipulation sub-tasks will consist of up to three basis lists. These are preconditions, an add-list, and a delete-list. In order for a task to be scheduled, its preconditions must be satisfied. If the task can then be run, the add-list, a list of things which are true after the execution of a task, is added to the world knowledge base (a symbolic rather than a structural description of the world), and those in the delete list are removed from the world knowledge base. In the case of carrying a red apple to a large bowl for example, the three lists may be as specified below:
Preconditions:
  known (locations(redapple,<old location>)),
  known(location(largebowl),known(location(robot gripper))
  empty(robot gripper), not too full(large bowl).
Add-list:—location(red apple, <new location>).
Delete-list:—location(red apple, <old location>).

The planner uses these lists to plan how it will complete the task. All preconditions must first be satisfied and then, when the task is complete, the world knowledge base is changed as specified in the add- and delete- lists to bring it up to date with the new state of the world. To actually plan a sequence of such actions requires a comparison of add and delete lists for different actions. For instance, in order to carry out the above plan, the system knows that it must first made the preconditions true. Therefore a task with an add-list which makes the location of the apple known must be scheduled (assuming it is not already known—in which case the task may be carried out immediately).

Given the necessity of gaining information from the image prior to undertaking a task, an object recognition task is scheduled. Recognition of objects brings in problems with uncertainty of information. Each component of the sub-task (to find the location of a red apple) has a computational and time cost associated with it, representing the effort involved in carrying out that component. In addition, the overall sub-task has a utility factor, reflecting how useful it is expected to be in recognising the object. In order to assess the best plan for recognition, the plan is first costed (by combining the costs of each elemental action), then this is divided by the utility. The plan with the minimum score is then scheduled.

When a plan for recognition is executed, it returns a "match strength", reflecting how well the incoming data reflects the internal model for the object. This is multiplied by the utility factor of the plan to produce the evidence value for that object being present in the picture. This is compared with a threshold for recognition. If the value exceeds the threshold, the object has been recognised. If not, a second plan may be scheduled to add efficiency, in the hope of taking the value over the threshold for recognition. If the match strength is negative however, this is evidence for the object not being present, and a negative threshold will decide when enough negative evidence has been produced. Thus the logical operation for assessing incoming information is as follows:

if negative threshold<(match strength*utility)<positive threshold then schedule further recognition procedures else if<negative threshold then object not present else if<positive threshold then object present.

Figure 26:
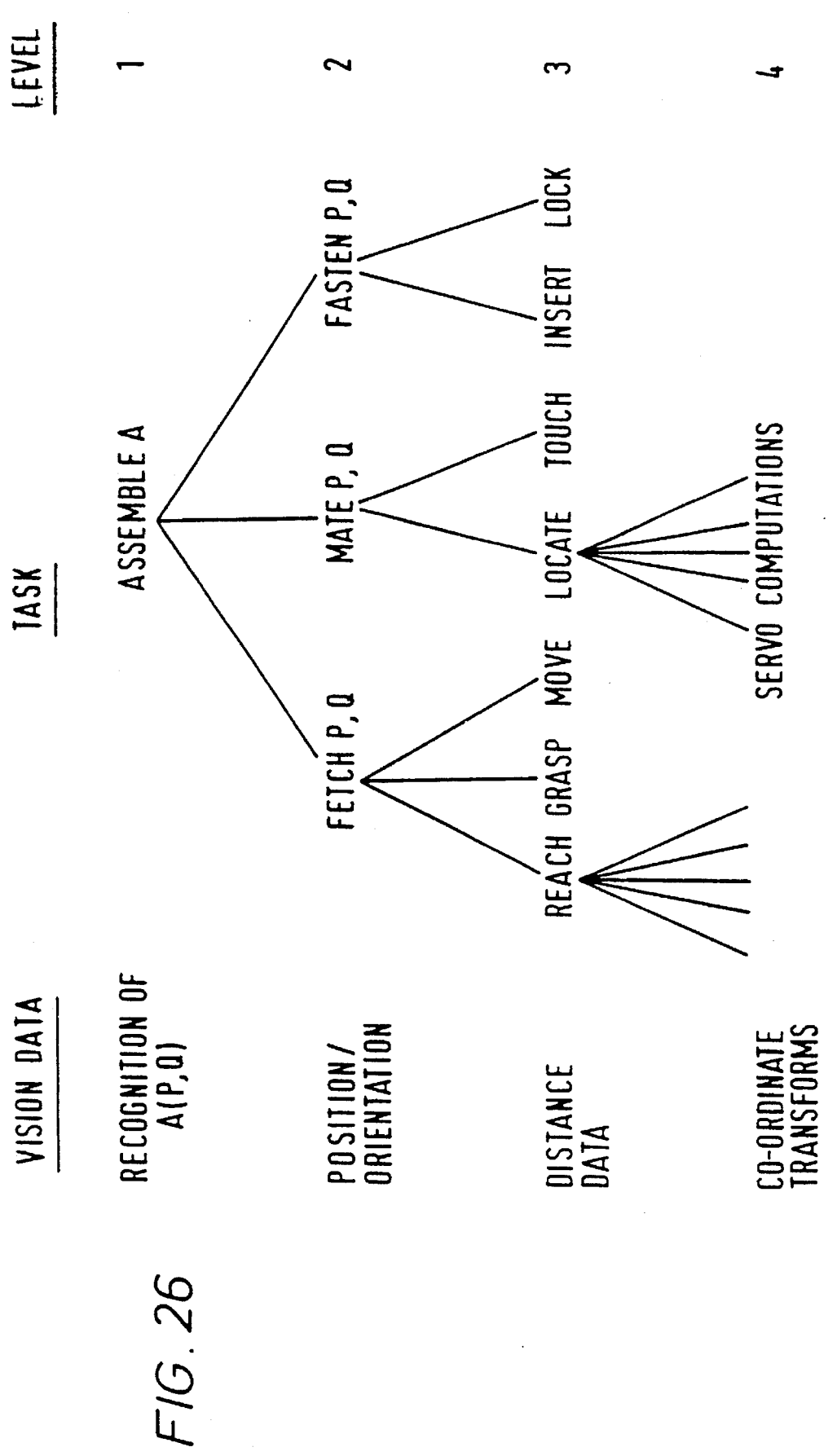
FIG. 26 shows the commanded task decomposition into levels representing specific actions.

FIG. 26 helps to clarify the concept of task decomposition and how it relates to visual data. A two part assembly of a system A with component parts P, Q is used as an example. In this example, the task is to assemble A from parts P and Q. This is represented at level 1 by the instructions "assembly A". The system breaks this instruct ion down into a number of subsidiary operations at level 2. For example, the robot arm must identify and fetch parts P and Q into the work area. Next it must bring P and Q together in the correct relative orientation so that P and Q mate together. Finally it must executed suitable fastening operations to ensure P and Q remain mated together. Each of these operations are broken down further into sub-operations at level 3. Finally the level 3 sub-operations are reducedito signals at level 4 which drive the joints in the robot arm, thus performing the required task.

As will have been appreciated from the above description, constructing a world model from a raw video image is a very complex and time-consuming process. The controller includes a scheme which bypasses this lengthy process and significantly improves the performance of the system.

Figure 27:
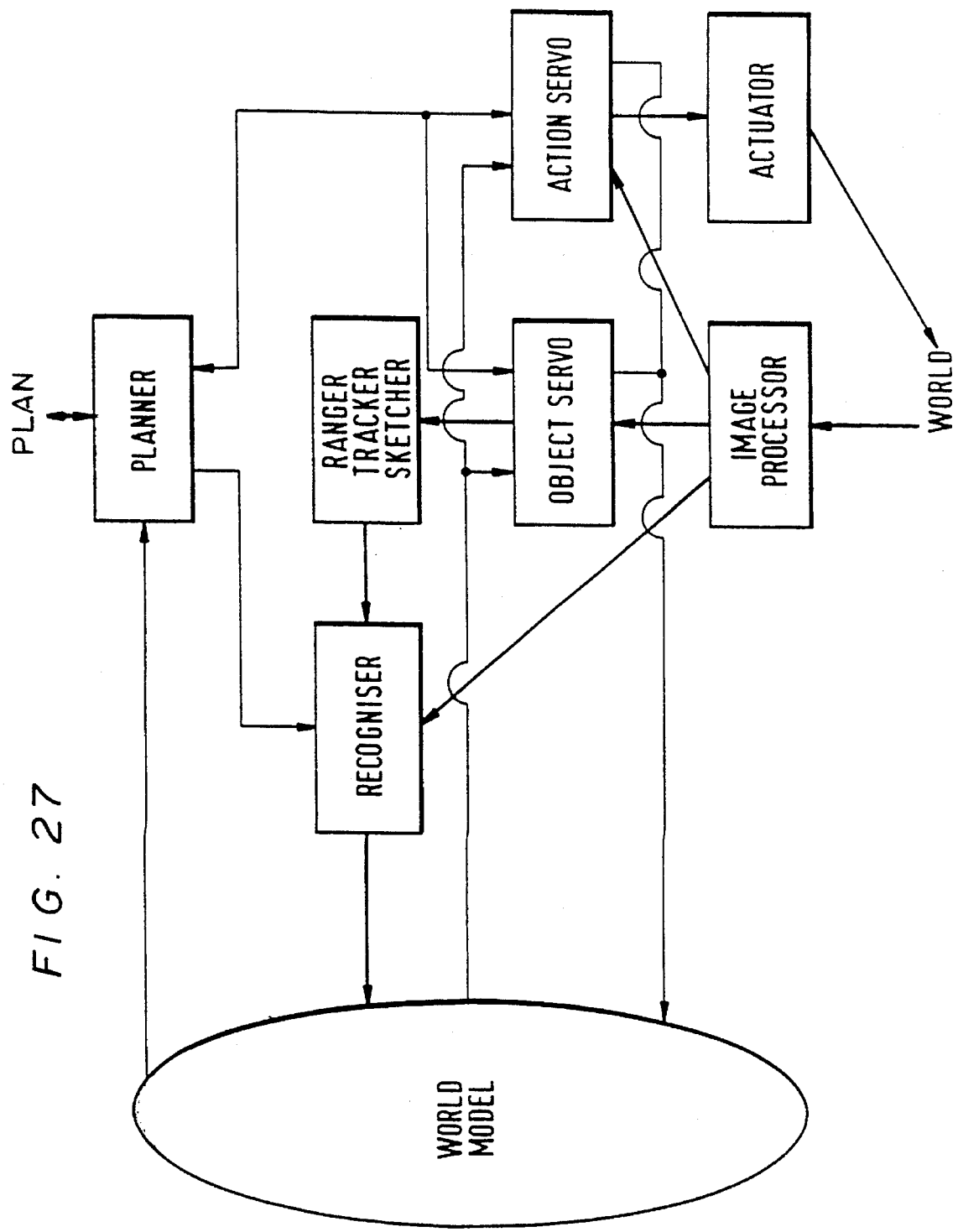
FIG. 27 shows how the controller interacts with the world model.

An example of this scheme is shown in FIG. 27.

FIG. 27 shows in generalised form how the image processing subsystem and the ranger, tracker, sketcher and recogniser subsystems interact to create a world model, that is to say a model stored in memory within the system which presents features of interest, and their relative positions, that fall within the robot arm workspace and the camera's field of view.

Figure 28:
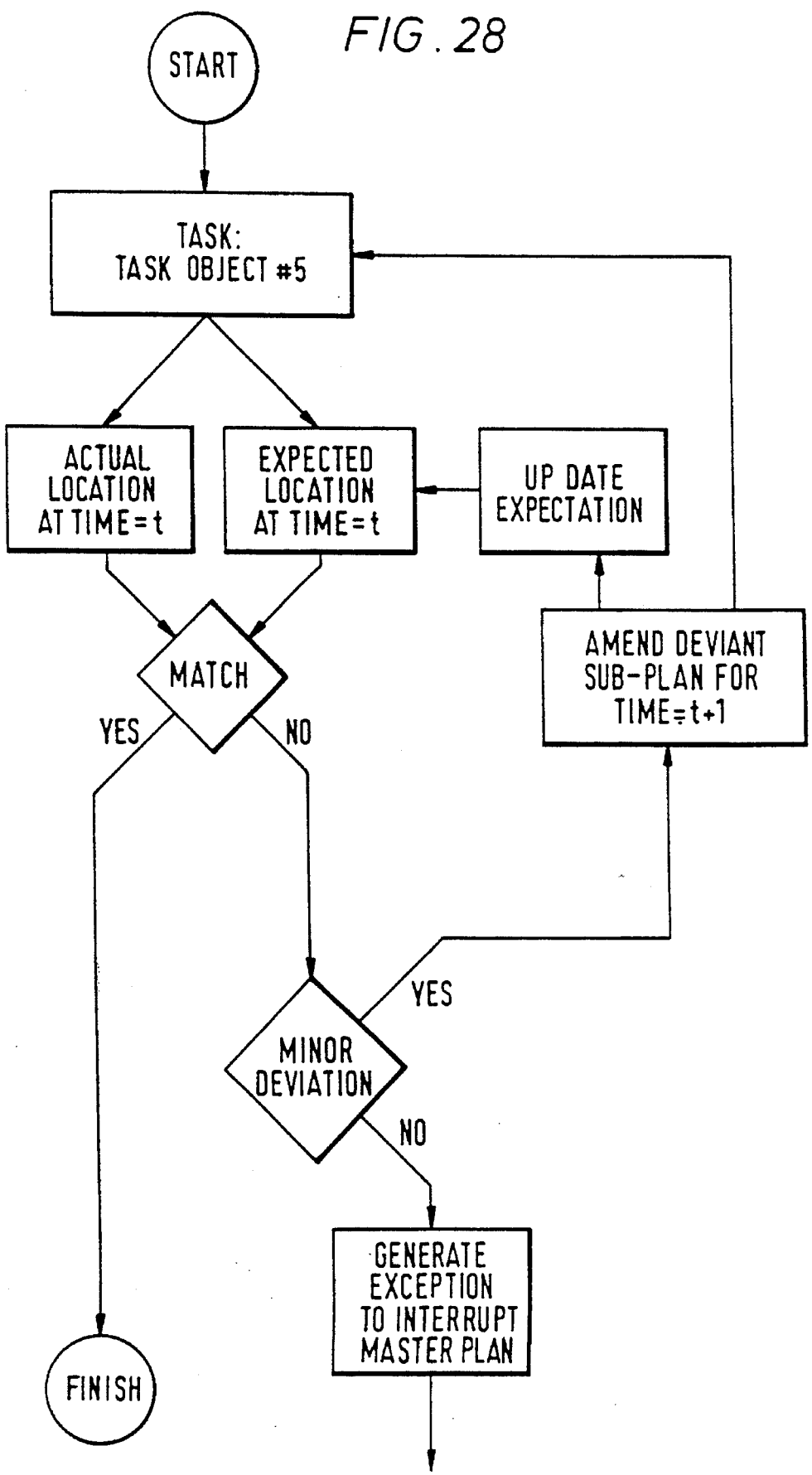
FIG. 28 shows the way in which the system tolerates deviations.

While the actions are in progress, the planner makes predictions about the behaviour of significant features of known objects, and these are compared with the actual behaviour of the features, which is determined by the early vision processing, as is shown in FIG. 28. The difference is used to make minor corrections to the plan and to alert the planner to unexpected events. If the problems with the world model deviate beyond defined tolerance levels, the planner demands from the ranger and recogniser, and other subsystems, re-evaluation of the scene before proceeding. In other words, in the event of unacceptable deviations, the planner first demands information from the ranger and the recogniser. If the planner is unable to gain sufficient information from these subsystems, the lower level subsystems are interrogated for further information.

Thus the emphasis of the system is redirected away from creating an ideal world model to one which maintains a world model which provides all the relevant information and yet offers the possibility of real time operation. Therefore, the fundamental objective of the system as a whole, which is to interact with the environment in a flexible manner, using all forms of sensory inputs including vision, is provided more efficiently in this scheme.

The planner is implemented as a number of communication modules which provide:

(i) a supervisory process with access to global states which has overall responsibility for the calculation and execution of the plan of action, and (ii) slave processes which work closely with the image processing and which filters out results for use by the supervisor.

The slave processes consist of processes running on the EVM hardware which take as input the feature vectors derived by the image processing. They find the significant features by matching against previous instances of image data held in local memory, update the local state to account for the new situation, and then alert the supervisory component of the planner to any changes. The matching is assisted by prior information passed down from the supervisor to the slaves regarding camera, and work arm position and orientation. In one sense then, the overall cognitive knowledge of the world model comprises global knowledge which can be matched against the current plan, and local knowledge which is used to track local features.

Two such slave processes are the Action Servo and the Object Servo as shown in FIG. 27. The action servo uses fiducial features found by the tracker to control robot arm actuation. The Object Servo provides up-to-date vertex lists for use by the ranger and recogniser, should repair to the world model become necessary.

Preferably, the EVM hardware is similarly shifted in emphasis away from image processing the low level subsystems towards planner-oriented processing. In view of this emphasis, the system is adaptable depending on the required task to be performed. For example, the provision of two robot arms and independent camera systems will increase the efficiency of the system as a whole. Continuous measurement of the positional error between the work arm and the workpiece as measured visually by either camera can be used to servo the arm or arms into the correct position. This also ensures that at least one camera is never obscured by the workpiece.

To summarise, the overall purpose of the controller system is to control the robot arm in the performance of commanded tasks. To achieve this in real-time the robot must be able to change its position and trajectories in response to visual feedback information.

The advantage of visual feedback of the kind described is that visual information can be used as a basis to drive the robot arm joints. The free end of the arm can be correctly guided in this way despite small inaccuracies inherent in the joint sensors due to, e.g. resolution limits. Another advantage is that the robot arm is made less sensitive to changes in its environment; for example, the system automatically compensates for any errors introduced in the joint drive mechanisms when the arm picks up a heavy object loading the drive mechanisms. Thus lit is possible to use robot arms that are less massive and rigid than has hitherto been possible with a resulting saving in cost.

The 3-dimensional internal map produced by the low-level subsystem may be accessed directly by both the high-level and the intermediate-level subsystems which interact with and help guide the low-level processing. For example, the high-level subsystem is able to suggest where to look for an object and what features to look for or to decide on contingency plans of action in cases of incomplete data.

The controller thus provides the integration of hitherto unrelated image analysis methods coupled with adaptive decision making processes.

The described embodiment is unique in that:

it determines three-dimensional relationships, using passive sensing techniques under normal lighting conditions;

it recognises features and analyse patterns both in space and time utilising new sensory processing algorithms and general purpose hardware; and it incorporates a control system that responds to a sensory data at different levels of abstraction and thus achieves full real-time sensory interactive behaviour.

It will be obvious to those skilled in the art that the above described control system is not limited in use to the control of a robot arm or arms. Nor is its use intended to be limited to applications with one imaging system. Moreover, the term "vision" is intended to include to all electronic imaging devices and is not limited to video camera systems alone.

APPENDIX A

EVM node control

```
PAR                             - top level EVM program
   SEQ                          - EVM application program
      system                    - system initialisation
      WHILE TRUE
         SEQ                    - main loop
            SEQ                 - ***** image processing
                                  phase *****
               copy current image from c-node to i-node
               PAR
                  SEQ           - i-node process
                     do image processing on current image
                  PAR           - c-node process
                     SEQ
                        DoInput()   - read next image from VME
                                      bus into c-node
                     SEQ
                        relay nearest-neighbour i-node
                              communications
            SEQ                 - ***** output phase *****
               DoOutput()       - if there is a request
                                  pending, DMA to ranger
            SEQ                 - ***** system phase *****
               system           - performance, error,
                                  exception handling,
                                  debug.
   SEQ                          - handle catastrophes
      supervisor
```

APPENDIX B

EVM node output procedure

```
PROC DoOutput()                 - s-node process (output
                                  phase)
   SEQ
      IF
         an interrupt has been received from the Vax DMA
         interface
            SEQ
```

APPENDIX B

EVM node output procedure

```
        collect local node-list from i-nodes in this
        cell
        assume bus mastership & write them to Vax
        interface
        down TokenRing! outputRequestTrue
        upTokenRing? outPutRequestTrue
        write a "DMA transfer complete" to Vax
        interface
    an interrupt has not been received from the
    VaxDMA interface
        downTokenRing! outputRequestFalse
        upTokenRing? outPutRequestFalse
PROC DoOutput()                    - c-node process (output
                                     phase)
SEQ
    downCnodes?token
    IF
        token = outputRequestTrue
            SEQ
                collect local node-list from i-nodes in this
                cell
                assume bus mastership & write them to Vax
                interface
                downTokenRing! outputRequestTrue
        token = outputRequestFalse
            downTokenRing!outputRequestFalse
```

APPENDIX C

EVM node input procedure

```
PROC DoInput()                     - s-node process (image
                                     processing phase)
    SEQ
        poll the framestore over the VME bus to ensure that a
        new frame is stored
        read tiles for this cell from framestore & apply pre-
        processing
        downTokenRing!frameValid   - inform c-nodes that new
                                     frame available
        upTokenRing?frameValid     - last c-node has fetched
                                     tiles
        initiate next frame grab from VME video input module
        to framestore
PROC DoInput()                     - c-node process (image
                                     processing phase)
    SEQ
        upTokenRing?frameValid     - new frame is now
                                     available
        read tiles for this cell from framestore & apply pre-
        processing
        downTokenRing!frameValid   - pass control downstream
```

We claim:

1. A vision based controller for use with an effector for controlling movement of the effector in the execution of a task having a predetermined task definition, the controller comprising:

at least one electronic camera arranged for providing a plurality of images relating to different views of objects or features in a defined workspace;

image processing means for processing images received from said at least one camera and corresponding to different views of said workspace to extract information relating to features in the images, said image processing means comprising an image segmenting means for segmenting images received from said at least one camera into regions of substantial uniformity and reducing the segmented images into a two-dimensional contour map representing edges of objects or features detected in the images;

information comparison means for comparing information extracted from at least two processed images corresponding to different views of the workspace with information held in a knowledge base to derive a three-dimensional internal model of the workspace;

planning means for planning a sequence of actions to be performed by said effector in the execution of said task, the sequence being derived from said predetermined task definition and from the derived three-dimensional internal model of the workspace;

monitoring means for monitoring actions performed by said effector; and dynamic comparing means for dynamically comparing said performed actions with planned actions of said sequence, and for interrupting the sequence if the performed action deviates to a predetermined extent from the planned action and for requesting amendment to the sequence.

2. A controller according to claim 1, in which the image segmenting means provides a vertex list which describes the contour map in terms of the connecting relationship between vertices in the contour map.

3. A controller according to claim 2, in which the image processing means comprises conversion means for converting contour maps and/or vertex lists from a plurality of images into a three-dimensional model of the workspace for comparison with information in the knowledge base by the information comparison means.

4. A controller according to claim 3 in which the conversion means comprises feature tracking means for tracking features found in at least a portion of one image to a corresponding feature in another image.

5. A controller according to claim 4 in which the conversion means comprises range finding means for finding the range of objects in the workspace by examining corresponding features in at least two images and deriving therefrom three-dimensional range information.

6. A controller according to claim 5 in which the range finding means comprises self-calibrating means for calibrating the camera by analysing images received by the camera of a known calibration object in the workspace.

7. A controller according to any one of claims 3 to 6 in which the conversion means comprises sketching means for sketching an image in terms of curves interconnecting the vertices identified in the contour map by the segmenting means.

8. A controller according to claim 7 further comprising means for bypassing the information comparison means once the internal model of the workspace has been derived.

9. A controller according to claim 7 in which the electronic camera provides color images which are converted into a monochrome scaler representation thereof by the image processing means prior to extraction of feature information.

10. A controller according to any one of claims 3 to 6 further comprising means for bypassing the information comparison means once the internal model of the workspace has been derived.

11. A controller according to claim 10 in which the electronic camera provides color images which are converted into a monochrome scaler representation thereof by the image processing means prior to extraction of feature information.

12. A controller according to any one of claims 3 to 6 in which the electronic camera provides, color images which are converted into a monochrome scalar representation thereof by the image processing means prior to extraction of feature information.

13. A vision based controller for controlling movement of a robot arm in a defined workspace, the controller comprising:

task decomposition means for decomposing a desired task input by a user into discrete actions to be performed by the robot arm;

image reducing means for reducing images of the workspace derived from one or more electronic cameras or other electronic imaging devices to reduced images containing only pertinent features;

workspace modelling means for deriving a three-dimensional model of the workspace from said reduced images;

storage means for storing a knowledge base of feature models known to the controller;

identifying means for identifying objects and the relative positions thereof in the workspace by comparing said three-dimensional model of the workspace derived from said reduced images with models of features stored in said knowledge base;

calculating means for calculating the robot arm movement required to perform the desired task from information associated with the discrete actions and the relative positions of the identified objects;

servo means for effecting movement of the robot arm in accordance with said calculations;

sensor means for indicating actual movements of the robot arm; and comparing means for comparing actual performance of the task as indicated by said sensor means with the required performance as determined by said calculating means and for stimulating recalculation by the calculating means in the event of a predetermined deviation from the required performance; and wherein said image reducing means comprises edge detecting means for detecting edges of objects or other features in the images, mapping means for mapping the detected edges into a topographical representation thereof, vertex detecting means for detecting vertices in the topographical representation and for producing descriptions of the detected vertices, and line detecting means for detecting lines in the topographical representation and for producing descriptions of the detected lines.

14. A controller according to claim 13 in which the task decomposition means comprise servo actuating means for actuating serves to drive the robot arm and the calculating means comprise converting means for converting calculated movements into signals to drive the servo actuating means.

15. A controller according to claim 14 in which the comparing means comprise means for requesting further images from the image reducing means to assist in the recalculation.

16. A controller according to claim 13 in which the comparing means comprise means for requesting further images from the image reducing means to assist in the recalculation.

17. A vision based method of controlling movement of a robot arm in a defined workspace, said method comprising:

decomposing a desired task into discrete actions to be performed by the robot arm;

reducing images of the workspace derived from one or more electronic cameras or other electronic imaging devices to images containing only pertinent features;

deriving a three-dimensional model of the workspace from said reduced images;

storing a knowledge base of known feature models;

identifying objects and their relative positions in the workspace by comparing said three dimensional model of the workspace derived from the reduced images with features stored in said knowledge base;

determining the robot arm movements required to perform the desired task from information associated with said discrete actions and the relative positions of the identified objects; and moving the robot arm and comparing sensed movements of the robot arm with the required movements and recalculating the required movements in the event of a predetermined deviation therefrom; said images being reduced to images containing pertinent features by detecting edges of objects or other features in the images and producing a topographical representation thereof, said topographical representation comprising a closed contour map and a corresponding vertex list providing connecting information relating to vertices in the contour map and further comprising a curve list providing connecting information relating to curves connecting the vertices in the contour map.

18. A method according to claims 17 in which the features known to the controller are held in a knowledge base of object features.

19. A method according to claim 18 in which further images are requested from the sensory system to assist in the recalculation.

20. A method according to claim 18 in which the sensory system is a vision system.

* * * * *